United States Patent [19]

Hershberger

[11] Patent Number: 4,806,717
[45] Date of Patent: Feb. 21, 1989

[54] DRIVE FOR A LAUNDRY MACHINE

[75] Inventor: Doran D. Hershberger, Sycamore, Ill.

[73] Assignee: General Electric Company, Fort Wayne, Ind.

[21] Appl. No.: 487,921

[22] Filed: Apr. 22, 1983

Related U.S. Application Data

[62] Division of Ser. No. 304,536, Sep. 22, 1981, Pat. No. 4,434,546, which is a division of Ser. No. 077,784, Sep. 21, 1979, Pat. No. 4,327,302.

[51] Int. Cl.⁴ .............................................. H02K 29/00
[52] U.S. Cl. .................................... 318/138; 318/254; 310/83; 310/89; 310/156; 310/184; 310/254
[58] Field of Search ..................... 310/46, 83, 216, 90, 310/180, 184, 156, 254, 89, 68 R; 318/254, 756, 138

[56] References Cited

U.S. PATENT DOCUMENTS

| | | | |
|---|---|---|---|
| 3,165,006 | 1/1965 | Barrick | 74/421 A |
| 3,307,426 | 3/1967 | Whitaker | 74/810 |
| 3,356,920 | 12/1967 | Button | 318/138 |
| 3,564,364 | 2/1971 | Neff | 318/756 |
| 3,599,062 | 8/1971 | Crane et al. | 318/281 |
| 3,969,658 | 7/1976 | Htsui | 318/202 |
| 4,005,347 | 1/1977 | Erdman | 318/254 |
| 4,097,755 | 6/1978 | Kitai | 310/83 |
| 4,104,859 | 8/1978 | Ogihara | 310/83 |
| 4,219,764 | 8/1980 | Terada | 310/83 |
| 4,232,536 | 11/1980 | Koseki et al. | 68/12 R |
| 4,390,826 | 6/1983 | Erdman et al. | 318/254 |
| 4,449,079 | 5/1984 | Erdman | 318/254 |

OTHER PUBLICATIONS

Chapter 6 of "Motors Speed Controls Servo Systems" (3rd Edition 1975); published by Electro Craft Corporation; Hopkins, Minnesota.

Primary Examiner—R. Skudy
Attorney, Agent, or Firm—Ralph E. Krisher, Jr.

[57] ABSTRACT

A drive for a laundry machine has an electronically commutated motor and a driving device arranged in mounting relation, and the driving means has means adapted for conjoint rotation with a rotatable assembly of the electronically commutated motor. Means associated with at least one of the rotatable assembly and the driving means is selectively operable for effecting a driven interconnection of the conjoint rotation emans with the rotatable assembly.

11 Claims, 13 Drawing Sheets

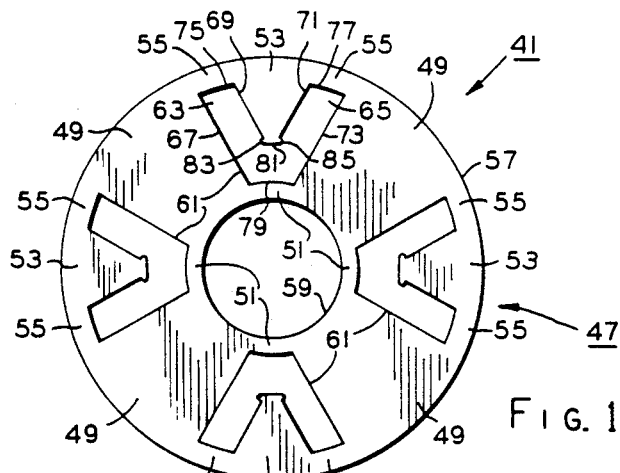

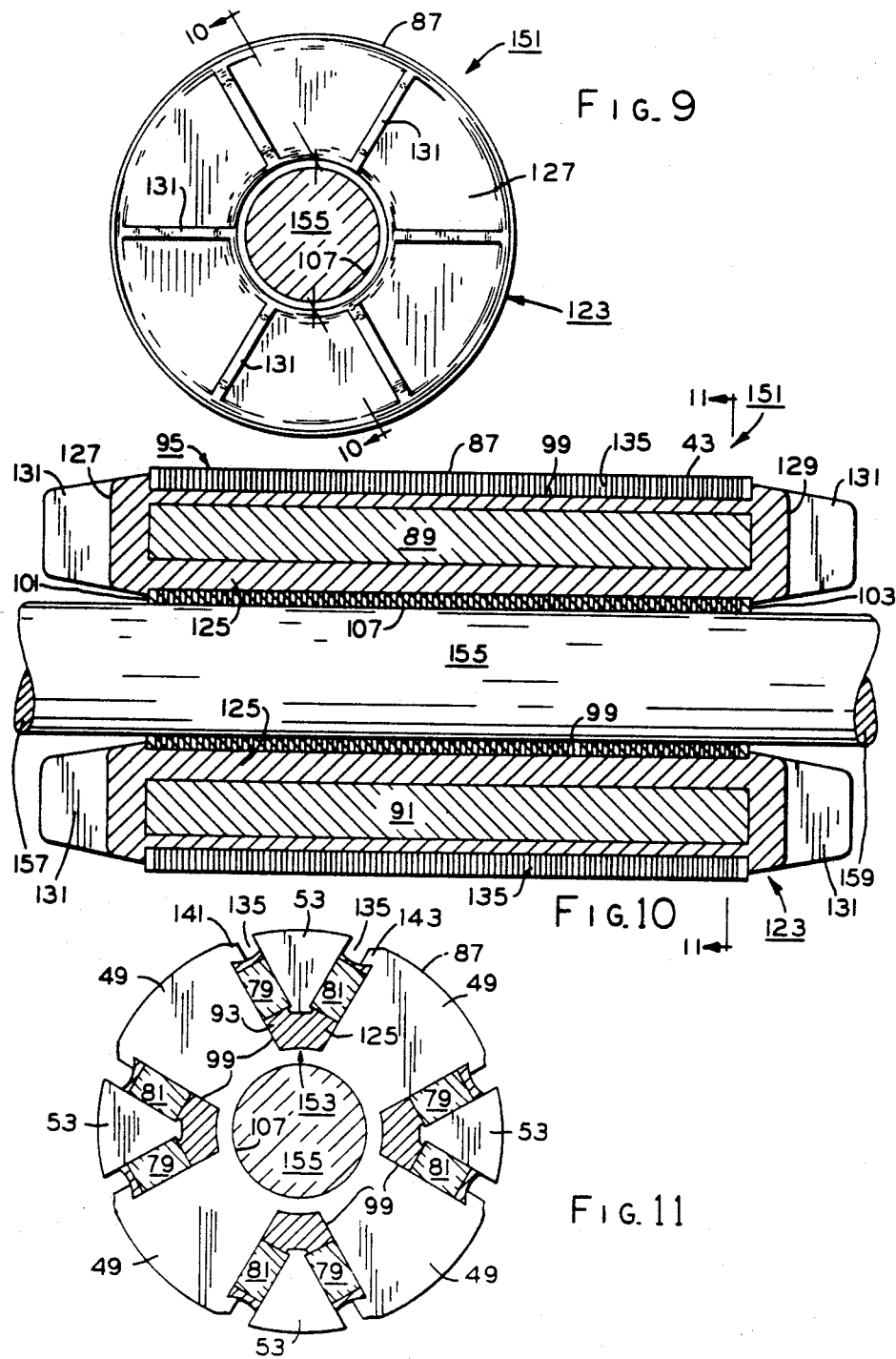

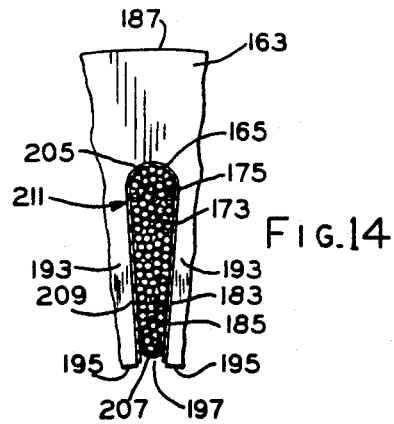
FIG.14
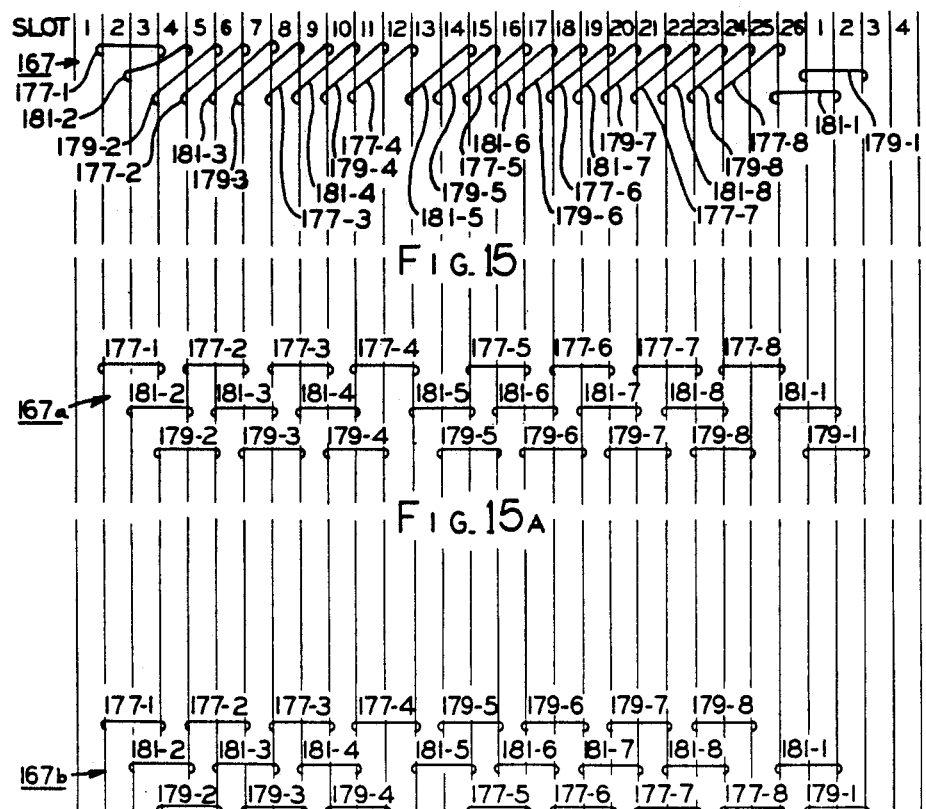
FIG.15
FIG.15A
FIG.15B

DRIVE FOR A LAUNDRY MACHINE

CROSS-REFERENCE TO RELATED APPLICATIONS

This application is a division of parent application Ser. No. 304,536 filed Sept. 22, 1981 (now U.S. Pat. No. 4,434,546 issued Mar. 6, 1984) which in turn was a division of grandparent application Ser. No. 077,784 filed Sept. 21, 1979 (now U.S. Pat. No. 4,327,302 issued Apr. 27, 1982), and such parent and grandparent applications are each incorporated herein by reference. This application is also related to commonly assigned applications Ser. No. 487,923 filed Apr. 22, 1983 (now U.S. Pat. No. 4,476,736 issued Mar. 20, 1984)and Ser. No. 487,922 filed Apr. 22, 1983 (now U.S. Pat. No. 4,437,325 issued Mar. 20, 1984) which are also division of the aforementioned patent application Ser. No. 304,536, and such commonly assigned related applications are each incorporated by reference herein.

FIELD OF THE INVENTION

This invention relates in general to domestic or commercial appliances and in particular to a drive for a laundry machine.

BACKGROUND OF THE INVENTION

In the past conventional DC motors, commutation was effected by brushes riding on a segmented commutator so as to control the currents flowing through the armature winding sections of such past conventional DC motors. Of course, one of the disadvantageous or undesirable features attendent to the above discussed commutated DC motors is believed to be that wear of the brushes thereof necessitated frequent brush replacement. Other disadvantageous features of these past commutated DC motors are belived to be that sparking may have occurred between the brushes and segmented commutator thereof which not only may have effected RF interference but also may have limited the use of such commutated DC motors in some critical or particular environmental applications.

Various circuit and motor design schemes have been utilized in the past to develop various types of brushless DC motors, and one such scheme is shown in the David M. Erdman U.S. Pat. No. 4,005,347 issued Jan. 25, 1977 and U.S. Pat. No. 4,015,182 issued Mar. 29, 1977, each of which are incorporated herein by reference. In these patents, a brushless DC motor has a stator with a plurality of windings therein, a rotor having a plurality of constant magnetic polar regions, and means for sensing the relative position of the rotor polar regions with respect to the stator. Positive signals developed by the position sensing means were processed by circuitry for selectively energizing the windings of the motor.

In the present day clothes washing or laundry machines having a generally coaxially arranged agitator and a spin tub, the agitator is rotated with an oscillating movement, and the rotation of the spin tub is unidirectional at a speed appreciably greater than that of the agitator oscillation. Of course, many different transmission mechanism and drive schemes have been employed in the past to effect the aforementioned particular oscillation and unidirectional rotation of the agitator and spin tub; however, it is believed that a disadvantageous or undesirable feature of such past schemes was that they were too costly and/or too complicated not only from the viewpoint of manufacture but also from the viewpoint of power usage and maintenance by the consumer.

SUMMARY OF THE INVENTION

Among the several objects of the invention may be noted the provision of an improved drive for a laundry machine which overcomes at least some of the above discussed disadvantageous or undesirable features, as well as others, of the prior art; the provision of such improved drives which utilizes an electronically commutated motor of a compact size and yet having a comparatively large output rating; the provision of such improved drive in which the inertia of the moving parts thereof is low; the provision of such improved drive which is selectively operable to transmit unidirectional and oscillation rotation from an input means thereof to a pair of output means; the provision of such improved drive which is directly driven by such electronically commutated motor; and the provision of such improved drive which is simplistic in design, easily assembled and economically manufactured. These as well as other objects and advantageous features of the present invention will be in part apparent and in part pointed out hereinafter.

In general and in one form of the invention a drive for a laundry machine is provided with an electronically commutated motor including a stationary assembly having a plurality of winding stages wound generally thereabout and adapted to be commutated in at least one preselected sequence and in a pair of preselected different sequence. A rotatable assembly is associated with the stationary assembly and has a plurality of polar regions adapted to be magnetically coupled with the winding stages so that the rotatable assembly is unidirectionally rotatable when the winding stages are commutated in the at least one preselected sequence and oscillative when the winding stages are commutated in the at least preselected different sequence pair, respectively. A transmission mechanism associated in mounting relation with the electronically commutated motor so as to be directly driven by the rotatable assembly thereof includes means adapted for conjoint rotation with the rotatable assembly. Means associated with at least one of the rotatable assembly and the transmission mechanism is selectively operable for effecting a driven interconnection through the transmission mechanism of the conjoint rotation means with the rotatable assembly.

BRIEF DESCRIPTION OF THE DRAWING

FIG. 1 is an enlarged plan view of a punched out rotatable assembly lamination;

FIG. 2 is a functional box diagram illustrating a method of making a core for use in a rotatable assembly of a dynamoelectric machine;

FIGS. 3-8 are enlarged partial views of the lamination of FIG. 1 and illustrate principles which may be practiced in the method represented by the functional box diagram of FIG. 2;

FIG. 9 is an end view of a rotatable assembly which may be formed in accordance with the method illustrated by the functional box diagram of FIG. 2;

FIG. 10 is a sectional view taken along line 10—10 of FIG. 9.

FIG. 11 is a sectional view taken along line 11—11 of FIG. 10;

FIG. 14 is a partial sectional view taken from FIG. 13 illustrating the disposition of coils of the winding stages with a coil receiving slot of the stationary assembly;

FIG. 15 is a schematic diagram illustrating the distribution of the winding stages in the coil receiving slots of the stationary assembly in FIG. 13;

FIGS. 15A and 15B are schematic diagrams illustrating the distribution of alternative winding stages as they may be arranged in the coil receiving slots of the stationary assembly of FIG. 3, respectively;

FIG. 26 is an enlarged partial view partially in cross-section taken from FIG. 25;

Corresponding reference characters refer to corresponding parts throughout the several views of the drawings.

Figure 4:
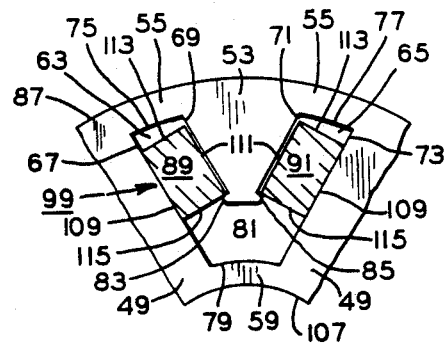

The exemplifications set out herein illustrate the preferred embodiments of the invention in one form thereof, and such exemplifications are not to be construed as limiting the scope of the invention in any manner.

DETAILED DESCRIPTION OF THE PREFERRED EMBODIMENTS

Referring now to the drawings in general, there is shown at 41 a lamination adapted to be used in a ferromagnetic core or rotor 43 of a dynamoelectric machine, such as an electronically commutated motor or brushless DC motor 45 or the like for instance (FIGS. 1, 9-11 and 16-18). Lamination 41 has a unitary body 47 blanked or otherwise formed from a generally thin ferromagnetic material, such as an electrical grade sheet steel or the like for instance, and a plurality of pole sections 49 are spaced apart from each other generally about the body (FIG. 1). A plurality of means, such as inner peripheral bridges or connecting arms 51 for instance, on body 47 are interposed between adjacent ones of pole sections 49 for bridging therebetween, respectively. A plurality of other pole sections 53 of body 47 are interposed in spaced relation between the adjacent ones of pole sections 49, and a plurality of sets or pairs of other means, such as outer peripheral bridges or connecting arms 55 or the like for instance, are interposed between the adjacent ones of pole sections 49 and pole sections 53 for bridging therebetween, respectively.

More particularly and with specific reference to FIG. 1, body 47 of lamination 41 has a pair of radially spaced outer and inner peripheral edges 57, 59 with the inner peripheral edge defining a generally centrally located shaft receiving bore or the like through the body, as discussed hereinafter. A plurality of openings, such as generally V-shaped apertures or slots 61 for instance, are provided through body 47 between peripheral edges 57,59 thereof, respectively, and the openings are arranged with each other in generally arcuate spaced relation about the body. Thus, pole sections 49 respectively are defined on body 47 generally between adjacent ones of openings 61.

Each of openings 61 has a pair of leg parts 63,65 tapering toward each other generally in a direction from outer peripheral edge 57 toward inner peripheral edge 59. Leg parts 63,65 each have a pair of opposite side edges 67,69 and 71, 73, and a pair of end edges or end portions 75,77 are interposed between the side edges generally adjacent outer peripheral edge 57 while a common end edge or end portion 79 is interposed between side edges 67,73 generally adjacent inner peripheral edge 59. Thus, side edges 67,73 of leg parts 63,65 are provided on adjacent ones of pole sections 49, and side edges 69,71 are provided on pole sections 53 between the adjacent ones of pole sections 49, respectively. Further, bridging means or inner bridges 51 are defined between inner peripheral edge 59 and common end edge 79 so as to integrally interconnect between pole sections 49, and sets or pairs of bridging means or outer bridges 55 are arranged between outer peripheral edge 57 and each end edge 75,77 of leg parts 63,65 in openings 61 so as to define narrow peripheral bands or strips on body 47 which may be deformed generally radially inwardly toward the leg parts, respectively, as discussed in detail hereinafter. Thus, bridges or bridge pairs 55 are integrally interconnected between each pole section 53 and the pole sections 49 adjacent thereto, respectively. Pole sections 53 are defined generally between side edges 69, 71 of leg parts 63,65 in openings 61 and extend therebetween generally radially inwardly from outer peripheral edge 57 toward inner peripheral edge 59. The radially inner ends of side edges 69,71 intersect with a free end edge 81 on pole section 53 which is arranged generally in opposite or facing relation with common end edge 79, and a pair of opposite tabs or abutments 83,85 integrally formed on each of pole sections 53 extend generally from the opposite side edges of the pole section at least generally adjacent the free end edge into leg parts 63,65 of openings 61, respectively. While openings 61 are described herein as being generally V-shaped in lamination 41, it is contemplated that other openings having different shapes may be employed within the scope of the invention so as to meet the objects thereof, and of course, such different shaped openings would also alter the shape of the pole sections.

Figure 5:
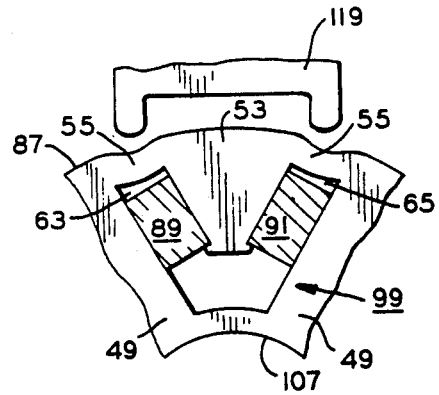
Figure 6:
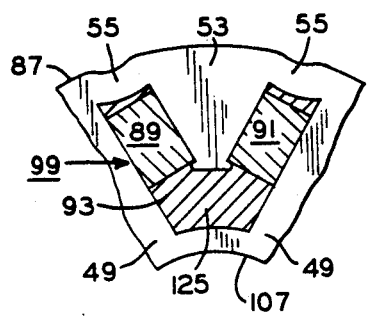

Referring again in general to the drawings and recapitulating at least in part with respect to the foregoing, there is illustrated a method for making, manufacturing or assembling rotor 43 which has a plurality of discrete polar regions or areas, such as generally defined by pole sections 49,53, with such polar regions or pole sections being spaced apart generally about a peripheral portion 87 of the rotor (FIGS. 3-10). In this method, pole sections 53 are positioned, disposed or otherwise located or arranged in preselected positions spaced between adjacent ones of pole sections 49 (FIGS. 1 and 3), and a plurality of sets or pairs of magnetic material elements 89,91 are disposed or otherwise arranged between pole sections 53 and the adjacent ones of pole sections 49, respectively (FIGS. 4 and 5). A hardenable nonmagnetic material 93 is provided in rotor 43 between pole sections 49,53 and magnetic material elements 89,91, so as to be solidified in place therebetween, and the nonmagnetic material acts along with the magnetic material elements to effect magnetic polarity definition between pole sections 49,53 while also retaining or maintaining the magnetic material elements and pole sections 53 in their preselected positions against displacement, respectively (FIG. 6). Hardenable material 93 may be aluminum, copper or respective alloys thereof or other nonmagnetic materials having good electrical conductivity properties.

More particularly and with specific reference to FIGS. 1-18 and 10, a plurality of laminations 41 are stacked or otherwise assembled together generally in juxtaposed or face-to-face relation, as illustrated generally in FIGS. 3 and 10, thereby to form a lamination stack 95 having a predetermined stack height or length required for rotor 43 of FIG. 10, and the stacking of the laminations is illustrated by functional diagram box 97 in FIG. 2. Either during or subsequent to the above discussed stacking of laminations 41 into rotor stack 95, openings 61 of the lamination are respectively aligned or otherwise arranged with each other so as to define a plurality of slots or slot openings 99 which extend through rotor 43 between a pair of opposite ends or end portions 101, 103 thereof, as best seen in FIGS. 3 and 10. Even though the alignment of openings 61 so as to form slots 99 may be accomplished during the stacking of laminations 41, as discussed above, such opening alignment is illustrated in a separate functional diagram box 105 of FIG. 2. Although slots 99 are shown as extending generally axially through rotor 43 between opposite ends 101, 103 thereof, it is contemplated that the slots may be slightly skewed during the alignment of openings 61 within the scope of the invention so as to meet at least some of the objects thereof. Further and albeit not shown for the sake of brevity, it is to be understood that suitable equipment may be employed to effect the stacking of laminations 41 and the alignment of openings 61 so as to form slots 99 through stator 43. Of course, it may also be noted that upon the above discussed alignment of openings 61, outer and inner peripheral edges 57, 59 of laminations 41 in stack 95 thereof are also generally aligned or otherwise arranged with each other so that outer peripheral edges 57 generally define peripheral portion or wall 87 on rotor 43 between opposite ends 101, 103 thereof and inner peripherial edges 59 generally define a shaft receiving bore 107 extending through the rotor between the opposite ends thereof, respectively, as best seen in FIG. 10. Of course, the particular edges on laminations 41 which define openings 61 therethrough, as discussed hereinabove, are also disposed generally in alignment with each other upon the alignment of the openings so as to form slots 99 in rotor stack 95, and such particular edges in their aligned formation define wall or wall means of the slot; however, for the sake of brevity, such slot walls will be designated by the reference numeral of such particular edges corresponding thereto when referred to hereinafter.

Figure 12:
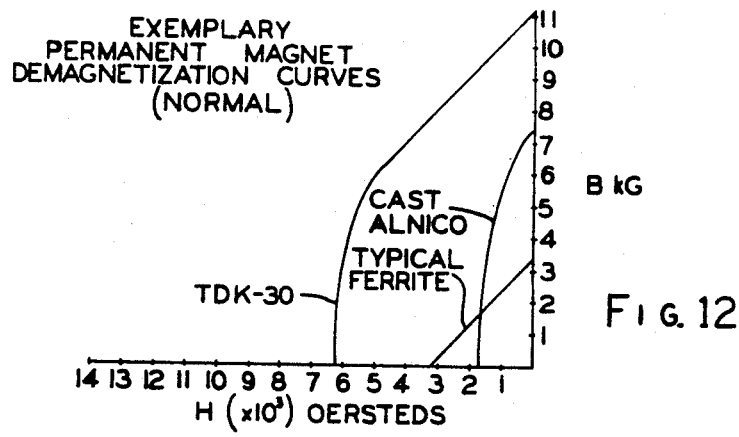
FIG. 12 is a graphical representation illustrating the magnetic properties of magnetic material elements utilized in the rotatable assembly of FIGS. 9-11 as well as those of other magnetic material elements.

Magnetic material elements 89,91, such as elongate block or bar magnets for instance, are provided with a pair of opposite generally flat surfaces or faces 109, 111 interposed between a pair of opposite generally flat intermediate surfaces or end faces 113, 115, respectively. When openings 61 of laminations 41 are aligned through rotor stack 95 to define slots 99 thereof, as discussed above, magnets 89,91 are respectively inserted, placed, positioned or otherwise disposed within of the slots so that opposite faces 109,111 of the magnets are arranged generally in facing relation with opposite sidewalls 67,69 and 71, 73 of the slots extending through rotor stack 95, respectively, as shown in FIG. 4. In other words, opposite faces 109, 111 of magnets 89,91 extend generally in face-to-face relation with pole sections 49,53 generally throughout their lengths with respect to slots 99 between opposite end faces 101, 103 of rotor stack 95. Of course, due to manufacturing tolerances for both lamination 43 and magnets 89, 91, it is contemplated that the magnets may be generally loosely positioned in slots 99. Upon the placement of magnets 89,91 within slots 99, opposite intermediate surfaces 115 of the magnets may be seated or otherwise located on opposite tabs 83,85 of pole sections 53 so that the other opposite intermediate surace 113 of the magnets are spaced from outer bridges or bridge sections 55 in rotor stack 95. Magnets 89,91 are available from TDK Electronics Co., Ltd., 2-14-6, Uchikanda, Chiyoda-ku, Tokyo, Japan under Model No. TDK-30 and generally have the magnetic characteristics as illustrated in the graph of FIG. 12. The placement of magnets 89,91 in slots 99 is illustrated in functional diagram box 117 in FIG. 2. While the particular shape and magnetic characteristics of magnets 89,91 are disclosed herein, it is contemplated that other magnets having other shapes and/or other magnetic characteristics may be employed in rotor 43 within the scope of the invention so as to meet the objects thereof, and it is also contemplated that more than two magnets may be utilized in the definition of a polar region of the rotor within the scope of the invention so as to meet the objects thereof. For the sake of comparison, the magnetic characteristics of some of the above mentioned other magnets which might be employed in rotor 43 are also shown in the graph of FIG. 12.

After the placement of magnets 89,91 within slots 99 of rotor stack 95, outer bridges 55 of laminations 41 are displaced or otherwise deformed generally along the entire length of the rotor stack between opposite ends 101, 103 thereof in a direction generally inwardly of the core stack or toward leg parts 63,65 of the slots, as shown in FIG. 5. Bridges 55 in rotor stack 95 may be so deformed by a tool 119, as illustrated schematically in FIG. 5, forced against outer peripheral portion 87 of rotor 43 generally along the bridges. In response to this deformation of outer bridges 55, pole sections 53 and magnets 89,91 are movable therewith and relative to pole sections 49 so that opposite faces 109, 111 of the magnets are abutted or otherwise engaged generally in face-to-face relation with pole sections 49 and pole sections 53, respectively. Of course, this deformation of outer bridges 55 and the resulting movement of pole sections 53 and magnets 89,91 is just great enough to take up the aforementioned manufacturing tolerances therebetween to insure that opposite faces 109,111 of the magnets are engaged in the face-to-face relation with pole sections 49,53 generally along the lengths thereof in slots 99. However, if the aforementioned manufacturing tolerances between magnets 89,91 and pole sections 49,53 are satisfactory so as to afford an acceptable or desirable flux transfer relation therebetween, it is contemplated that the above discussed deformation of bridges 55, as illustrated in functional diagram box 121, of FIG. 2, may be omitted from the method of manufacturing rotor 43. Albeit not shown for the purpose of disclosure brevity, it is understood that suitable equipment may be utilized to effect the deformation of outer bridges 55 generally simultaneously or in any given order so as to effect the tolerance take-up movement of pole sections 53 and magnets 89,91, as discussed above.

With magnets 89,91 so respectively positioned within slots 99 in abutment between pole sections 49, 53, a squirrel cage winding, indicated generally at 123 in FIGS. 9 and 10, is integrally formed with rotor stack 95, and the squirrel cage winding comprises a pluraltiy of rotor bars 125 extending through the slots and integral with pair of opposite generally annular end rings 127, 129 disposed on opposite ends 101, 103 of the core stack between peripheral portion 87 and bore 107 thereof, respectively. If desired, a plurality of fan blades 131 may also be integrally formed with end rings 127, 129, respectively. Of course, it is contemplated that suitable equipment may be employed to effect the formation of squirrel cage winding 123 with rotor stack 95; however, for the sake of brevity, a disclosure of such equipment is omitted. In the formation of squirrel cage winding 123, hardenable material 93 is provided or otherwise introduced into the interstices within slots 99 generally about magnets 89,91 therein and between pole sections 49, 53 and inner and outer bridges 55,59, respectively, as shown in FIG. 6. Thus, hardenable materials 93 fills the aforementioned interstices within slots 99 throughout the lengths thereof between opposite ends 101, 103 of rotor stack 95, so as to define bars 125 therein, and generally simultaneously therewith, opposite end rings 127, 129 of the hardenable material are formed or otherwise defined on opposite ends 101, 103 of the rotor stack, respectively. Of course, hardenable material 93 may be poured, cast, injected or otherwise provided in slots 99 of rotor stack 95 so as to effect the generally simultaneous formation of bars 125 and opposite end rings 127, 129 of squirrel cage winding 123 with the rotor stack upon the solidification in place of the hardenable material. The formation of squirrel cage winding 123 is illustrated generally by a functional diagram box 133 in FIG. 2.

Figure 7:
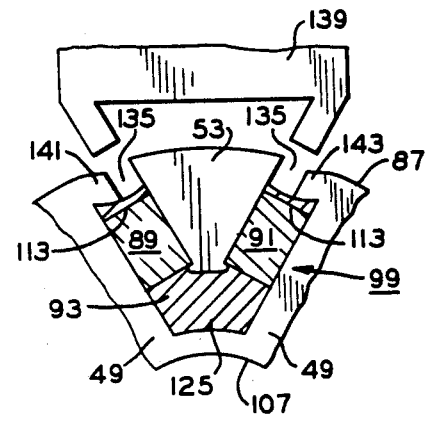

When hardenable material 93 is solidified in situ so as to form squirrel cage winding 123 on rotor stack 95, as discussed above, a part of each deformed outer bridge 55 may be removed from peripheral portion 87 of the core stack so as to provide a plurality of grooves or spaces 135 between pole sections 49, 53 disjoining or otherwise disassociating them along the entire length of the core stack between opposite ends 101, 103 thereof, respectively, as shown in FIG. 7 and illustrated by a functional diagram box 137 in FIG. 2. To effect this aforementioned disjoinder of pole sections 49, 53, a tool, such as a milling or broaching tool or the like for instance as schematically illustrated at 139 in FIG. 7, may be engaged with deformed outer bridges 55 on peripheral portion 87 of rotor stack 95 and operated to machine away portions or sections of the bridges along the entire length of the core stack between opposite ends 101, 103 thereof so as to effect the physical separation or disjoinder of pole sections 49, 53. However, it should be noted that upon the above described disjoinder of pole sections 49, 53, grooves 135 are located or otherwise arranged between the pole sections so that remaining parts or sections of deformed bridges 45 define a pair of opposed flanges or extensions 141, 143 on adjacent ones of pole sections 49 which extend therefrom in part over leg parts 63,65 of slots 99 along the length of rotor stack 95 betwen opposite ends 101, 103 thereof, respectively. It is, of course, contemplated that deformed outer bridges 55 may be machined generally simultaneously or in any selected order. Also, it is contemplated that suitable equipment may be utilized to effect the machining of deformed outer bridges 55, but for the sake of brevity, a disclosure of such equipment is omitted.

Upon the above discussed disjoinder of pole sections 49, 53, it may be noted that portions of hardenable material 93 are predeterminately solidified in place or otherwise arranged between the pole sections within slots 99 so as to be abutted or otherwise engaged between opposed flanges 141, 143 on pole sections 49 and opposite surfaces 113 of magnets 89, 91. Since opposite surfaces 115 of magnets 89,91 are seated on opposite tabs 83,85 of pole sections 53, the coaction of the magnets and the aforementioned portions of hardenable material 93 engaged between flanges 141, 143 and opposite surfaces 113 of the magnets serve to cage or otherwise retain or maintain pole sections 53 against displacement from slots 99, respectively. Further, it may also be noted that the disposition of hardenable material 93 and magnets 89, 91 within slots 99 in abutment between pole sections 49,53 also serve to effect the magnetic polarity definition between the pole sections. In other words, hardenable material 93 and magnets 89,91 in their respective abutting or spacing relation between pole sections 49,53 effectively magnetically define the polarity of pole sections 53 from that of adjacent ones of pole sections 49 which are integrally interconnected with each other by inner bridges 59. Thus, in response to the magnetic affect of magnets 89,91, pole sections 53 are each magnetized so as to have the same polarity while pole sections 49, which are integrally interconnected by inner bridges 59, each are magnetized so as to have a polarity opposite to that of pole sections 53. In view of the foregoing, it may be further noted that pole sections 49,53 define discrete constant polar regions or areas extending generally about peripheral portion 87 of rotor 43 and between opposite ends 101, 103 thereof, respectively.

Figure 8:
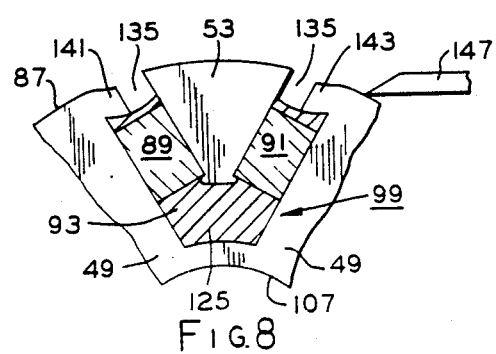

Subsequent to the disjoinder of pole sections 49, 53 in rotor stack 95, peripheral portion 87 thereof may be turned or otherwise machined to provide the rotor stack with a preselected diameter. As seen in FIG. 8 and as illustrated by a functional diagram box 145 in FIG. 2, outer peripheral edges 57 of laminations 41 in rotor stack 95 may be engaged and machined by a tool, such as a lathe bit or the like for instance illustrated schematically at 147 in FIG. 8, thereby to provide peripheral portion 87 of the rotor stack with a preselected outside diameter generally between opposite ends 101, 103 thereof. While the above discussed turning of rotor stack 95 to the preselected outside diameter thereof may be performed by certain equipment, such as a lathe or the like for instance, a disclosure of such equipment is omitted for the sake of brevity.

With respect to the magnetization of magnets 89,91, it is preferred that such magnetization be accomplished upon the assembly of electronically commutated motor 45, as discussed hereinafter. In other words, once electronically commutated motor 45 is assembled together, pole sections 49,53 of rotor 43 may be aligned under a particular one of the winding stages of the electronically commutated motors, and when so aligned, a relatively high current may be passed through such particular one winding stage thereby to effect the magnetization of magnets 89,91, as well known in the art. Of course, it is contemplated that suitable equipment may be utilized to effect the magnetization of magnets 89,91 in rotor 43, as discussed above, but for the sake of brevity, a description of such suitable equipment is omitted. While the magnetization of magnets 89,91 in rotor 43 as discussed above is preferred, it is also contemplated that the magnets could be magnetized before they are disposed in rotor slots 99 or subsequent to the completion of the assembly of rotor 43 by magnetizing pole sections 49,53 thereof all at the same time within the scope of the invention so as to meet at least some of the objects thereof.

Referring again in general to the drawings and recapitulating at least in part with respect to the foregoing, there is shown a rotatable assembly 151 which is adapted to be used in dynamoelectric machine 45 (FIGS. 9–11 and 18). Rotatable assembly 151 comprises rotor 43 having a plurality of means, such as slots 99 which may be thought of as including grooves 135 for receiving pole sections 53 in the rotor (FIGS. 10 and 11). Means, indicated generally at 153, is provided in receiving means or slots 99 for defining the the magnetic polarity of pole sections 53 with respect to adjacent parts of rotor 43, such as for instance the ones of pole sections 49 of the rotor adjacent pole sections 53, and for retaining or maintaining pole sections 53 against displacement from the slots, respectively (FIGS. 10 and 11). Defining and retaining means 153 include magnets 89,91 disposed between pole sections 49,53 and hardenable material 93 solidified in place in slots 99 between pole sections 49,53 and the magnets, respectively (FIGS. 10 and 11).

More particularly and with specific reference to FIGS. 9–11, rotor 43 has its shaft receiving bore 107 defined therein by inner peripheral edges 59 of laminations 41 in rotor stack 95, and the bore intersects with opposite ends 101, 103 of rotor 43, respectively, as previously mentioned. A shaft 155 is disposed in bore 107 in displacement preventing engagement with rotor 43, and a pair of opposite extensions or end sections 157,159 on the shaft extend generally axially beyond opposite ends 101, 103 of rotor 43, the shaft extensions being adapted to be suitably journaled in dynamoelectric machine 45, as discussed hereinafter. Rotor 43 and shaft 155 may be assembled together in the displacement preventing engagement by suitable means, such as press-fitting or heat shrinking for instance. In the preferred embodiment of rotatable assembly 151, rotor 43 is heated to effect expansion of bore 107 therein, and at least one of the rotor and shaft 155 are moved with respect to the other thereof in order to position the bore in a preselected coaxial location about the shaft with respect to at least one of opposite extensions 157, 159 thereof. When so located, rotor 43 is allowed to cool thereby to effect the contraction or heat shrinking of the rotor and its bore 107 into the displacement preventing or gripping engagement with shaft 155 in the preselected coaxial location thereon. While rotatable assembly 151 is disclosed having eight poles, it is contemplated that other rotatable assemblies having different numbers of poles may be utilized within the scope of the invention so as to meet at least some of the objects thereof.

Figure 13:
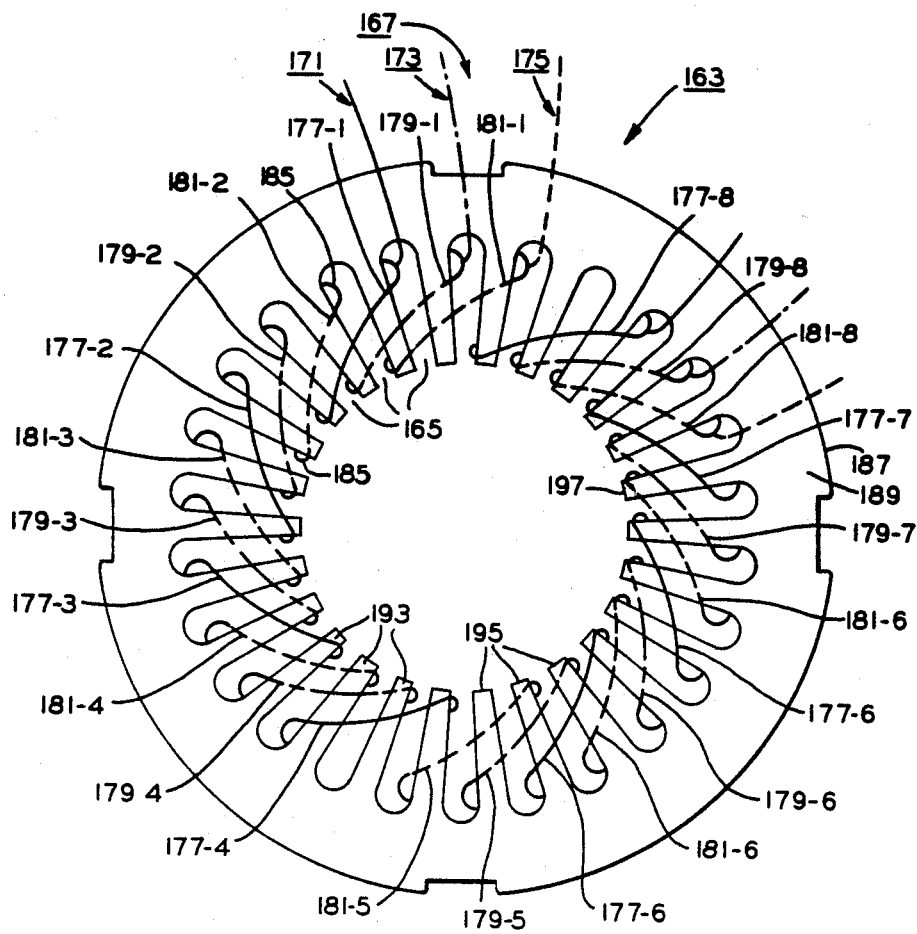
FIG. 13 is a greatly enlarged end view illustrating a stationary assembly with a plurality of winding stages schematically shown and arranged in the stationary assembly.

With reference again in general to the drawings, a stationary assembly 161 shown is adapted to be used in electronically commutated motor 45 (FIGS. 13–18). Stationary assembly 161 comprises a ferromagnetic core or stator 163 with a plurality of winding receiving slots 165 disposed generally thereabout (FIGS. 13 and 14). A multi-stage winding arrangement, indicated generally at 167, includes a plurality of winding stages 171, 173, 175 each having a plurality of coils 177-1 to 177-8, 179-1 to 179-8 and 181-1 to 181-8 with each of the coils thereof having at least one conductor turn 183 with opposite side portions 185 received or otherwise accommodated in respective ones of slots 165, respectively (FIGS. 13 and 15). Most, or at least some, of coils 177, 179, 181 in winding stages 171, 173, 175 have a side turn portion 185 thereof sharing a respective one of slots 165 with a side turn portion of other coils in the same winding stage, respectively (FIGS. 13 and 15). Two pairs of coils 179 in winding stage 173 have a side turn portion 185 thereof sharing respective ones of slots 165 with two pairs of coils 177, 181 in winding stages 171, 175, and two pairs of coils 167, 181 of winding stages 171, 175 have a side turn portion thereof which do not share a respective one of slots 165, respectively (FIGS. 13 and 15).

Figure 18:
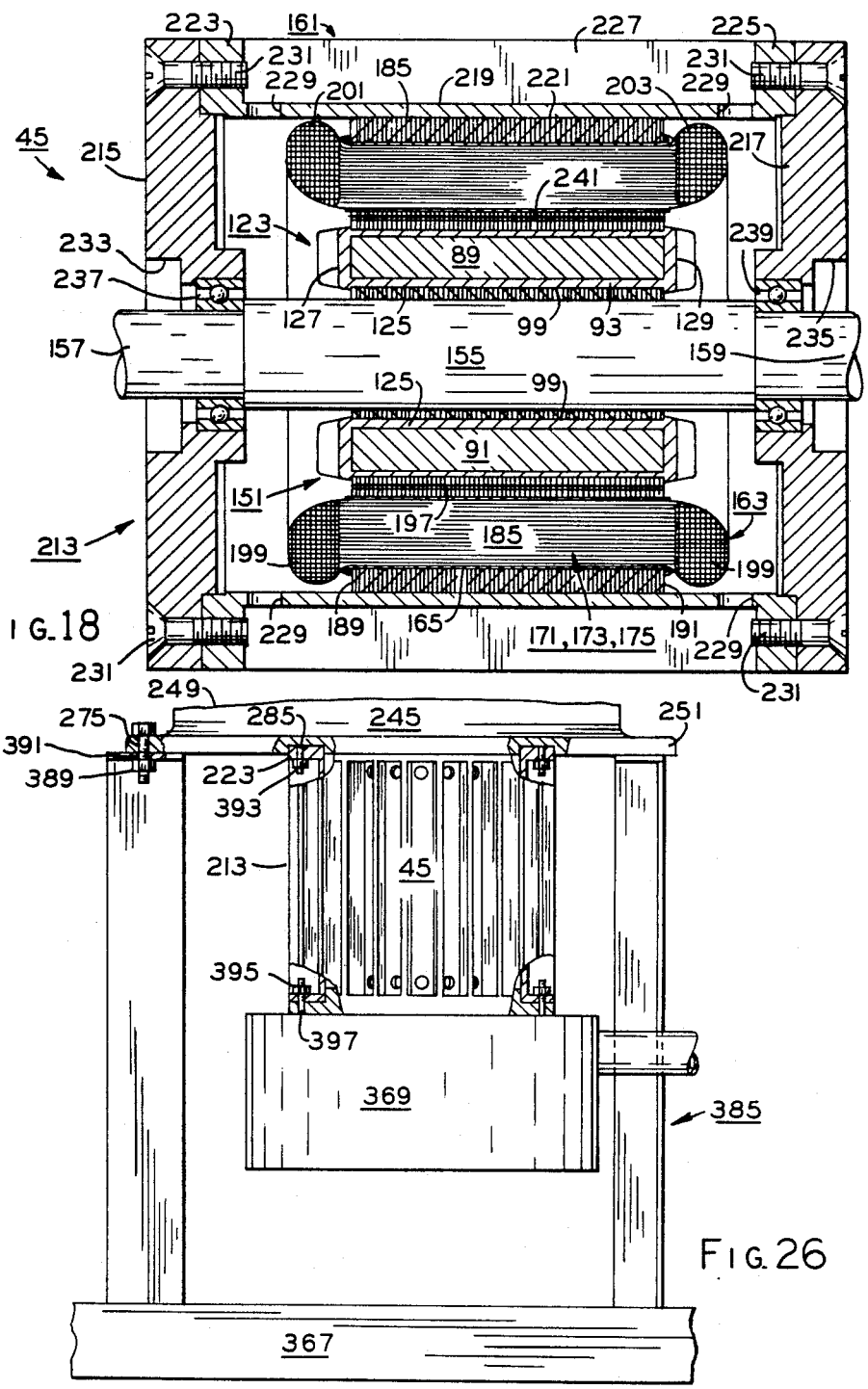
FIG. 18 is a sectional view taken along line 18—18 of FIG. 17.

More particularly and with specific reference to FIGS. 13–15, and 18, stator 163 has a generally cylindric shaped peripheral portion or section 187 interposed or interconnected between a pair of opposite end faces or portions 189, 191 of the stator; however, it is contemplated that other stators having various other shapes, such as opposite peripheral flats thereon for instance as well as other slot shapes or configurations, may be utilized within the scope of the invention so as to meet at least some of the objects thereof. A plurality of teeth 193 are integrally formed on stator 163 between adjacent ones of winding slots 165 with the teeth and slots extending generally axially through the core so as to intersect with opposite end faces 189, 191 thereof, and the teeth have generally arcuately spaced apart tips or radially inner ends 195 which define, at least in part, a bore 197 extending generally axially through the core between the opposite end faces thereof, respectively. While twenty-six winding slots 165 are disclosed in stator 163, it is contemplated that other stators having more or less winding slots, as discussed hereinafter, and also having winding slots of various other shapes may be utilized within the scope of the invention so as to meet at least some of the objects thereof. Furthermore, while teeth 193 and tips 195 thereof are illustrated herein as being generally radially extending or straight, it is contemplated that teeth and tips thereof having various other shapes or positions in stator 163 could be employed within the scope of the invention so as to meet at least some of the objects thereof. Thus, as best seen in FIGS. 13 and 14, side portions 185 of coils 177, 179, 181 in winding stages 171, 173, 175 may be placed or otherwise inserted either manually or by suitable automatic coil injection equipment (not shown) generally from bore 197 of stator 163 between adjacent ones of teeth 193 and tips 195 thereof into winding slots 165, respectively. Since coil side portions 185 are arranged within winding slots 165, opposite end turns or end turn portions 199 of coils 177, 179, 181, which integrally connect with opposite side turn portions 185 thereof, are arranged so as to form a pair of opposite end turn groupings 201, 203 adjacent opposite end faces 189, 191 of stator 163 extending generally about bore 197 radially outwardly thereof, as best seen in FIG. 18.

As best seen in FIG. 14, a slot liner 205 of suitable insulating material is disposed in each of slots 165 so as to insulate side turn portions 185 of coils 177, 179, 181 disposed in respective ones of the slots from stator 163; however, it is contemplated that other types of slot lining insulation, such as a resin insulation layer deposited on or otherwise integrally formed with the stator for instance, may be utilized within the scope of the invention so as to meet at least some of the objects thereof. Further, a slot wedge 207 of suitable insulating material is disposed across each of slots 165, so as to engage adjacent ones of teeth 193 at least adjacent tips 195 thereof thereby to contain side turn portions 185 of conductor turns 183 against displacement from the slots, respectively. Thus, due to the aforementioned winding configuration or arrangement of coils 177, 179, 181 of winding stages 171, 173, 175, one of opposite side turn portions 185 of the coils is positioned in a top section 209 of a respective one of slots 165 and the other of the opposite side turn portions of the coils is positioned in a bottom section 211 thereof, respectively, with only the exception of the coil side turn portions which do not share slots, as discussed in detail hereinafter. Albeit not shown, suitable insulation between winding stages 171, 173, 175 including end turn groupings 201, 203 thereof may be utilized, if desired, within the scope of the invention so as to meet at least some of the objects thereof.

Coils 177, 179, 181 of the three winding stages 171, 173, 175 are disposed in slots 165 of stator 163 generally in the aforementioned lapped winding configuration, FIGS. 13–15; however, it is contemplated that not only a greater or lesser number of winding stages but also winding stages having different winding configurations, such as those illustrated in FIGS. 15A and 15B for instance, may be employed within the scope of the invention so as to meet at least some of the objects thereof. Further, it may be noted that each of coils 177, 179, 181 in each winding stage spans three of teeth 193, i.e., coil side turn portions 185 are contained in every fourth one of slots 165; however, it is contemplated that the coils may span a greater or lesser number of the teeth within the scope of the invention so as to meet at least some of the objects thereof. In multi-stage winding arrangement 167, it may be noted that coils 177-1 to 177-3 and 177-5 to 177-7 of winding stage 171, coils 179-2, 179-3 and 179-5 to 179-7 of winding stage 173, and coils 181-2 to 181-4 and 181-6 to 181-8 of winding stage 175 have one of their opposite side turn portions 185 sharing a respective one of slots 165 with one of the side turn portions of the coils in the same winding stage. It may also be noted that coils 179-1, 179-5 and 179-2, 179-4 of winding stage 173 have one of said turn portions 185 thereof sharing a respective one of slots 165 with one side turn portion 185 of coils 177-4, 177-8 and 181-3, 181-5 in winding stages 171, 175, respectively. Further, it may also be noted that coils 177-1, 177-5 and 181-4, 181-8 of winding stages 171, 175 each have a side turn portion 185 which does not share a respective one of slots 165, respectively.

An alternative multi-stage winding arrangement for stator 163 is shown schematically in FIG. 15A. In this alternative winding arrangment 167a, coils 177-1 to 177-8 of winding stage 171 are disposed in the bottom sections 211 of slots 165, coils 179-1 to 179-8 of winding stage 173 are disposed in the top sections 209 of the slots, and coils 181-1 to 181-8 of winding stage 175 are disposed in the slots between the aforementioned coils in the top and bottom sections of the slots.

Another alternative multi-stage winding arrangement 167b for stator 163 is shown schematically in FIG. 15B. Although alternative winding arrangement 167b is somewhat similar to winding arrangement 167a, it may be noted that coils 177-5 to 177-8 of winding stage 171 are shifted to the top sections 209 of slots 165 while coils 179-5 to 179-8 of winding stage 173 are shifted to the top sections 211 of the slots for reactance purposes. Of course, coils 181-1 to 181-8 of winding stage 175 are disposed in slots 165 between the top and bottom sections 209, 211 thereof.

Figure 16:
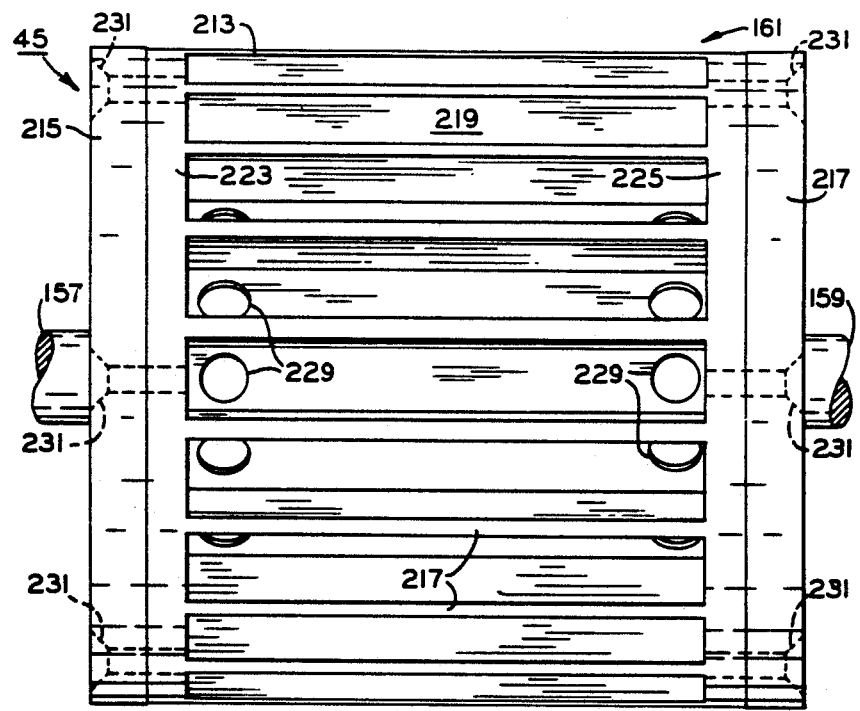
FIG. 16 is an actual size plane view illustrating an electronically commutated motor.
Figure 17:
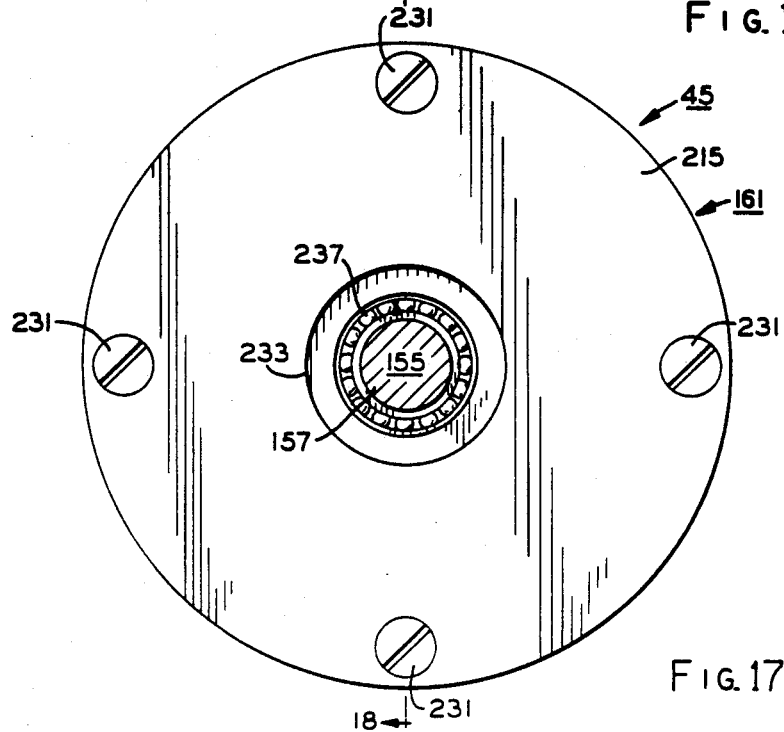
FIG. 17 is an end view of the electronically commutated motor of FIG. 16.

Referring now to FIGS. 16–18, electronically commutated motor or brushless DC motor 45 comprises stationary assembly 161 with stator 163 thereof disposed within a housing 213, and rotatable assembly 151 is arranged in magnetic coupling relation with the stator and suitably journaled in a pair of opposite end shields 215, 217 of the stationary assembly which are secured to the housing, respectively.

More particularly, housing or shell 213 comprises a generally cylindric sleeve 219 which may be formed of any desired material, and the sleeve has a bore 221 extending therethrough between a pair of opposite annular end flanges 223, 225 or the like integrally formed with the sleeve. A plurality of cooling fins 227 are integrally formed on sleeve 219 externally thereof between end flanges 223, 225, and a plurality of vent holes 229 may be provided, if desired, through the sleeve adjacent the end flanges so as to intersect with sleeve bore 221, respectively. Peripheral portion 187 of stator 163 is received within sleeve bore 213 being retained therein by suitable means such as for instance a press-fit or heat shrinking between the peripheral portion of the stator and the sleeve bore. While housing 213 is illustrated for purposes of disclosure, it is contemplated that other housings having other component parts different from those illustrated herein may be utilized within the scope of the invention so as to meet the objects thereof.

End shields 215, 217 are secured to housing 213 adjacent opposite end flanges 223, 225 of sleeve 219 by suitable means, such as a plurality of screws 231 or the like for instance, respectively. A pair of generally centrally located bearing openings 233, 235 extend through end shields 215, 217, and a pair of bearing means, such as self-lubricating bearings 237, 239 for instance, are mounted in the openings respectively. Rotor 43 of rotatable assembly 151 is generally coaxially arranged within stator bore 197 of stationary assembly 161 so as to provide a predetermined air gap 241 therebetween, and shaft extensions 157, 159 of the rotatatable assembly extend through bearings 237, 239 so as to journaled thereby, respectively. Thus, it may noted that pole sections 49,53 of rotor 43 are disposed in magnetic coupling relation with winding stages 171, 173, 175 in stator 163 which are adapted to be commutated or energized in a plurality of preselected sequences and/or a plurality of preselected different sequences, as discussed hereinafter. Albeit not shown, the commutation of winding stages 171, 173, 175 in the aforementioned plurality of preselected sequences and/or plurality of preselected different sequences may be effected through the connection of such winding stages with suitable circuitry, such as for instance that disclosed in abandoned applications of Harold B. Harms and David M. Erdman Ser. No. 077,776 filed Sept. 21, 1979 and David M. Erdman Ser. No. 077,656 filed Sept. 21, 1979, and each of these applications is incorporated by reference herein.

While stator 163 of electronically commutated motor 45 may have some characteristics comparable to those of a conventional A.C. motor, such as for instance being wound by existing coil winding and placement equipment employed in the manufacture of A.C. motors, it may be noted that the number of slots 165 employed in stator 163 to accommodate multi-stage winding arrangement 167 is different than the product of an integer multiplied by the number of poles in rotatable assembly 151. In this vein, an alternative designation of the required number of slots 167 in stator 165 may be stated by the following equation:

$$s = P(S)(X) \pm y$$

where
  s = number of slots in stator 165;
  P = number of poles in rotatable assembly 151;
  S = the number of winding stages;
  X = a selected integer greater than zero; and
  y = an integer not less than one or greater than two.

Thus, it may be noted that the twenty-six winding slots 165 in stator 163 accommodates the three winding stages 171, 173, 175 magnetically coupled with the eight poles of rotatable assembly 151 so as to satisfy the aforementioned equation, and the number of slots in the stator, i.e., twenty-six slots, is different than the product of an integer multiplied by the eight poles of the rotatable assembly.

Figure 19:
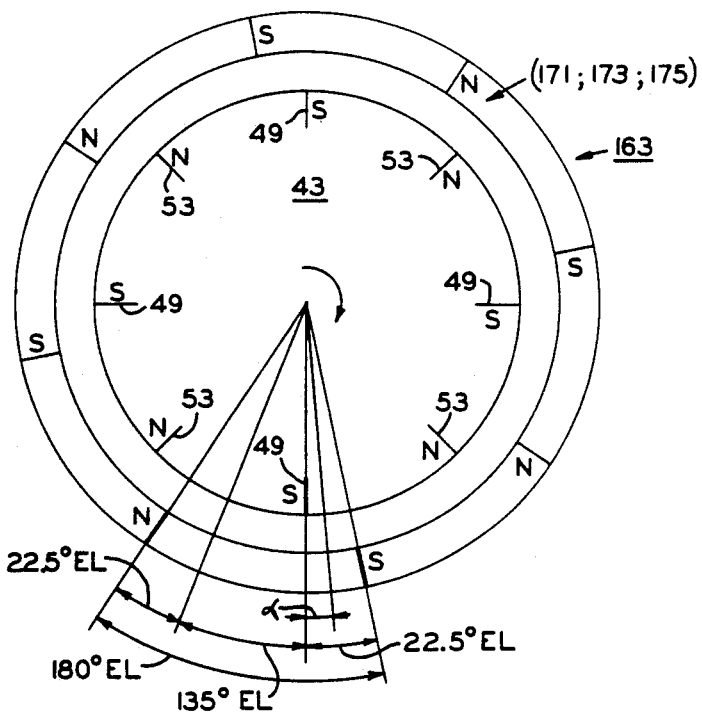
FIG. 19 is a diagrammatic representation illustrating positions of pole sections in the rotatable assembly of the electronically commutated motor of FIGS. 16-18 with respect to the winding stages in the stationary assembly thereof at the instant one of the winding stages is commutated so as to be excited.
Figure 20:
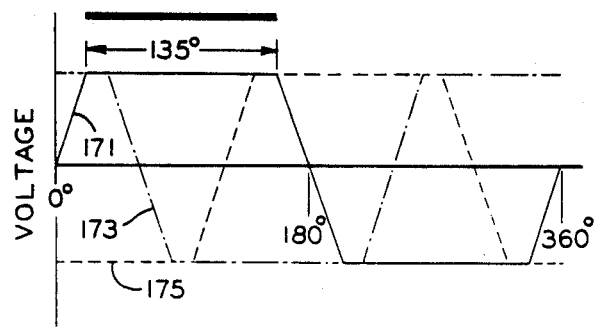
FIG. 20 is a graphical representation of the voltage which may be developed upon the selective energization of the winding stages in the electronically commutated motor of FIGS. 15-19.

In the operation of electronically commutated motor 45 with reference to FIG. 19, it is desirable to provide an advanced timing angle, i.e., an advancement of the energization of commutation of winding stages 171, 173, 175, which is defined as angle $\alpha$ in FIG. 20. In explanation of this timing angle advancement, zero advancement would occur in electronically commutated motor 45 if one of winding stages 171, 173, 175 thereof would be energized at the instant the magnetic center of one of pole sections 49,53 in rotor 43 rotated into a position spaced approximately twenty-two and one-half electrical degrees from the axis of one of the magnetic pole established by the energization of such one winding stage. Of course, zero advancement is believed to be the theoretical optimum with zero winding stage inductance, and energization of the aforementioned one winding stage a preselected number of electrical degrees before the theoretical optimum position of rotor 43 is attained comprises the advancement of commutation, i.e., advanced timing angle $\alpha$. Of course, the particular advanced timing angle $\alpha$ selected for the operation of electronically commutated motor 45 may be incorporated into the aforementioned circuitry of applications Ser. No. 077,776 and Ser. No. 077,656 which, as previously mentioned, is operable to effect the switching or energization of winding stages 171, 173, 175 in the plurality of preselected sequences and/or preselected different sequences thereof. In further explanation, the preferred amount of advancement of timing angle $\alpha$ is associated with the L/R time constant of multi-stage winding arrangement 167. At the aforementioned zero advancement, current in winding stages 171, 173, 175 would build up too slowly to achieve maximum possible torque throughout the full "on" time. Thus, advancing the commutation angle, as discussed above, takes advantage of the fact that the generated back emf is less during incomplete coupling, i.e., when the polar axii of rotor 43 and the energized one of winding stages 171, 173, 175 are not in exact alignment; therefore, current build-up time and torque development can be improved. If the advanced timing angle is too great, current overshoots may occur thereby to adversely affect efficiency; therefore, the optimum value of the advanced timing angle depends to some extent on the desired speed at which electronically commutated motor 45 is operated and the torque desired therefor.

With continued reference to FIG. 19, assume that winding stage 171 of multi-stage winding arrangement 167 in electronically commutated motor 45 is instantaneously energized, and under this assumption, the centers of the north and south magnetic poles established by winding stage 171 have been noted as N171 and S171, respectively. The general location of the polar axii or centers of polar sections 49, 53 of rotor 33 are designated as S49, N53 and S49 and N53, respectively. If winding stages 171, 173, 175 were commutated with aforementioned zero advancement in a preselected sequence thereof, the N,S poles associated with respective ones of the winding stages will appear and disappear as the winding stages are energized and de-energized in the preselected sequence thereof. Thus, as may be noted from FIG. 19, when the center of the magnetic poles S49, N53 of rotor 43 are positioned twenty-two and one-half electrical degrees past a like one of stator poles N171, S171, theoretically winding stage 171 should be energized at this instant so as to establish the poles N171, S171, and winding stage 171 should remain energized during the subsequent one hundred thirty-five electrical degrees rotation of the rotor. Then, winding stage 171 would be de-energized. The next one of winding stages 173, 175 in the preselected sequence would be similarly energized. However, instead of commutating winding stages 171, 173, 175 with zero advancement in the preselected sequence thereof, as discussed above, it is preferred to effect the operation of electronically commutated motor 45 so that winding stages 171, 173, 175 thereof are commutated in advance of the theoretical commutation point or angle (i.e., zero advancement) by the predetermined advanced timing angle $\alpha$ (in electrical degrees).

In the light of the foregoing discussion, the commutation or energization of winding stages 171, 173, 175 in the preselected sequence thereof effects the magnetic coupling therewith of rotatable assembly 151 causing unidirectional rotation of the rotatable assembly in the clockwise direction, as indicated by the directional arrow in FIG. 19, with respect to stator 163. It may be noted that if winding stages 171, 173, 175 were so energized in a preselected sequence reverse to that discussed above, the magnetic coupling of the winding stages with rotatable assembly 151 would cause a reverse unidirectional rotation thereof in the counterclockwise direction with respect to stator 163. Further, it may also be noted that the rotational speed of rotatable assembly during the unidirectional rotation thereof in both the clockwise and counterclockwise directions may be varied by varying at least the frequency at which winding stages 171, 173, 175 are commutated in the preselected sequence thereof. In addition, it may be further noted that winding stages 171, 173, 175 may be commutated or energized in preselected different sequences effecting the magnetic coupling therewith of rotatable assembly 151 so as to cause oscillation of the rotatable assembly in both the clockwise and counterclockwise direction with respect to stator 163. The speed of such rotatable assembly oscillation may be varied in the same manner as discussed above, and the amplitude of such rotatable assembly oscillation may be varied by varying the successive energization of the winding stages 171, 173, 175 during the preselected different sequences of energization thereof. For instance, in determining the frequency of the amplitude for the oscillation of rotatable assembly 151, it is contemplated that winding stages 171, 173, 175 could be commutated so that the rotatable assembly acts as a generator. In other words, when winding stages 171, 173, 175 are so commutated, rotatable assembly 151 then generates a voltage which is induced into the winding stages creating a back emf thereby to effect the termination of the oscillation movement of the rotatable assembly generally at the preselected amplitude of such oscillation movement. Of course, the unidirectional rotation of rotatable assembly 151 may, if desired, also be terminated by shorting out winding stages 171, 173, 175 so that the rotatable assembly acts as a generator, or if desired, the winding stages may merely be de-energized.

FIG. 20 is a graphical representation of voltage of one winding stage, such as winding stage 171 for instance, developed by electronically commutated motor 45. The solid trapezoidal curve illustrates the instantaneous voltage in winding stage 171 for a revolution through one pair of adjacent pole sections 49, 53 in rotor 43. The dashed trapezoidal curves are similarly shown for winding stages 173 and 175 to represent their respective instantaneous voltage contributions. The heavy solid curve displays the net affect of winding stage 171 being energized for one hundred thirty-five electrical degrees only with winding stage 175 being energized for one hundred thirty-five electrical degrees and so on for winding stage 175. If a more detailed discussion is desired with respect to the commutation of winding stages 171, 173, 175 to effect the operation of electronically commutated motor 45, reference may be had to the aforementioned U.S. Pat. No. 4,005,347.

Figure 21:
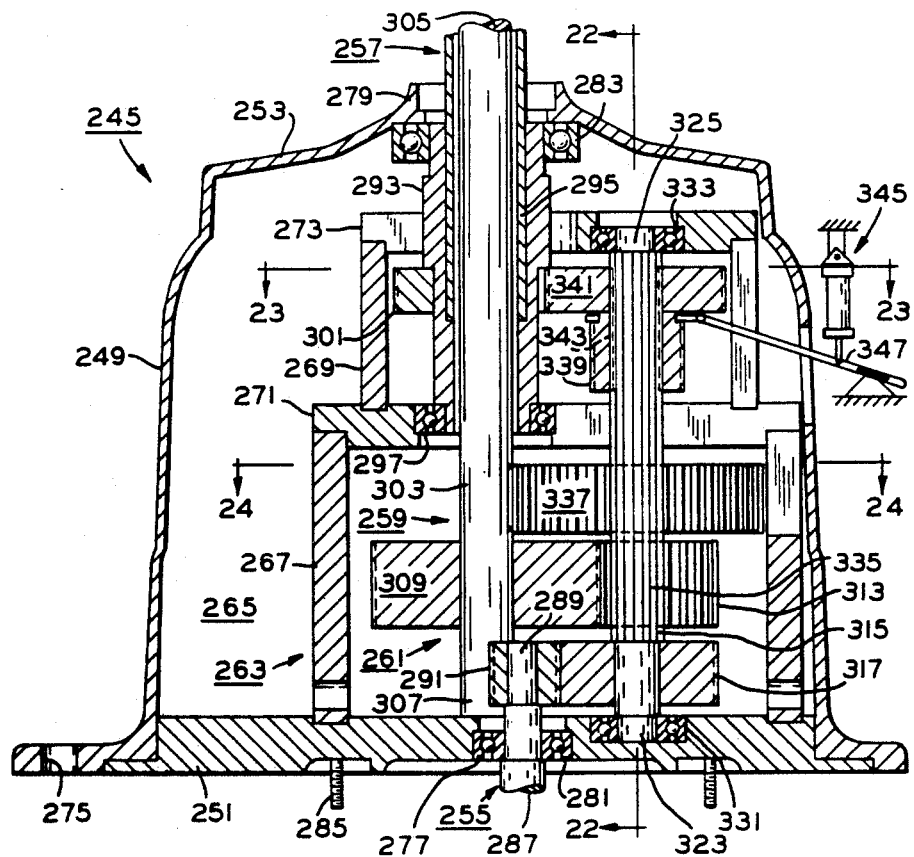
FIG. 21 is a sectional view illustrating a transmission mechanism adapted for use in a laundry machine.
Figure 23:
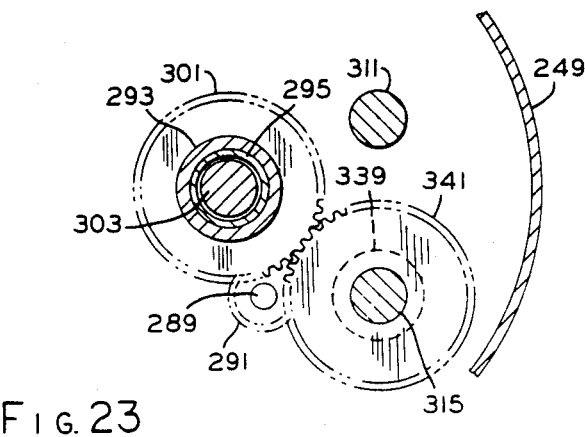
FIGS. 22-24 are sectional views taken along lines 22—22, 23—23 and 24—24 in FIG. 21, respectively.
Figure 24:
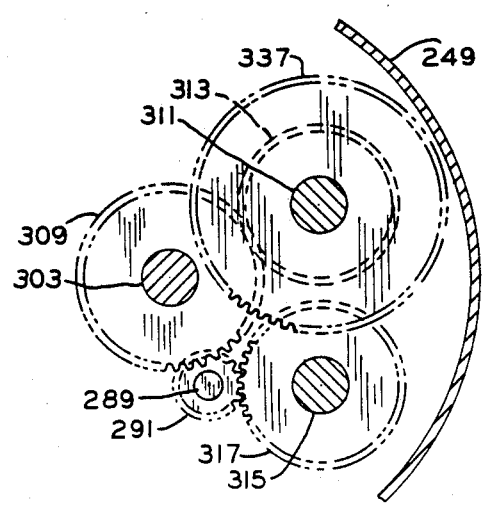

With reference again in general to the drawings, a transmission mechanism 245, which is adapted to be employed in a laundry or clothes washing machine 247, is shown having a housing or casing 249 with a pair of opposite end portions or walls 251, 253 (FIGS. 21–26). Input means 255 extending through opposite end portion or wall 251 of casing 249 is operable for rotation so as to oscillate in one operating mode of transmission mechanism 245 and also for rotation unidirectionally in another operating mode of the transmission mechanism (FIG. 21). A pair of generally coaxially arranged output means 257, 259 extending through opposite end portion or wall 253 of casing 249 are operable generally for conjoint rotation with input means 255 during the one and another operating modes of transmission mechanism 245, respectively (FIGS. 23 and 24). Means, indicated generally at 261, is disposed in casing 249 for transmitting to output means 257 the rotation of input means 255 during the aforementioned one operating mode while output means 259 is at rest and for transmitting to output means 259 the rotation of the input means during the aforementioned another operating mode while output means 257 is at rest, respectively.

More particularly and with specific reference to FIGS. 21–24, casing or cover 249 of transmission mechanism 245 encases a bearing support or housing indicated generally at 263, disposed within a chamber 265 of the casing. Bearing support 263 includes a pair of cylindric sidewalls 267, 269 with cylindric sidewall 267 being seated on casing end wall 251. An intermediate support wall or plate 271 is interconnected between cylindric sidewalls 267, 269, and an upper support wall or plate 273 is connected to the upper end of cylindric sidewall 269 generally adjacent end wall 253 of casing 249. A plurality of mounting openings 275 may be provided in casing 249 so as to mount transmission mechanism 245 in laundry machine 247, as discussed hereinafter. Opposite end walls 251, 253 have a pair of openings 277, 279 extending threrethrough so as to intersect with chamber 265, and a pair of bearing means 281, 283 are supported in the openings in journaling engagement with input means 255 and output means 257, respectively. If desired, a plurality of mounting studs 285 may be integrally or otherwise provided on lower end wall 251 so as to extend therefrom for receiving electronically commutated motor 45 when transmission mechanism 245 is mounted in laundry machine 247, as discussed hereinafter.

Input means 255 includes an input shaft 287 journaled in bearing means 281 and extending through opening 277 in end wall 251 with a free end or end portion 289 disposed generally adjacent end wall 251 within chamber 265. An input or pinion gear 291 within chamber 265 is carried on free end 289 of input shaft 287 so as to be conjointly rotatable therewith, and the input shaft is adapted to be rotated or driven unidirectionally and also so as to oscillate in opposite directions.

Output means 257 includes a tubular output shaft 293 having a generally axial bore 295 therethrough, and the tubular output shaft extends through opening 279 in casing end wall 253. Output shaft 293 is journaled in bearing means 283 in casing end wall 253 and extends through support wall 273 so that a lower interior or free end of the output shaft is journaled in another bearing means 297 disposed in another opening 299 extending through intermediate support 271. An output, driven or pinion gear 301 is carried about tubular shaft 293 so as to be conjointly rotatable therewith, and the output gear is arranged so as to extend from the tubular shaft generally in spaced relation between supports 271, 273.

Output means 259 includes an output shaft 303 which extends generally coaxially through bore 295 of tubular shaft 293, and output shaft 303 has an exterior or free end or end portion 305 exteriorly of chamber 265 with an opposite interior free end of end portion 307 within the chamber. Albiet not shown, interior end 307 of output shaft 303 is journaled in a bearing means provided therefore in casing end wall 251, and exterior end 305 of output shaft 307 may be journaled in suitable bearing means (not shown) provided therefore. Another output, driven or pinion gear 309 is carried by output shaft 303 generally adjacent interior end 307 thereof so as to be spaced between casing end wall 251 and support wall 271 within chamber 265.

Transmitting means 261 is provided for transmitting the rotational movement of input shaft and gear 287,291 to tubular output shaft and gear 293, 301 and to output shaft and gear 303, 309, respectively. Transmitting means 261 includes means, such as a driving or idler shaft 311 and a pinion gear 313 carried thereon, associated in coupled relation with output shaft and gear 303, 309 for driving it, and means, such as a driven or idler shaft 315 and a pinion gear 317 carried thereon, associated in coupled relation with input shaft and gear 287,291 for being driven by it. Driving and driven means or idler shafts 311, 315 each have a pair of opposite end portions 319,321 and 323, 325 journaled in a pair of bearing means 327 329 and 331, 333 with bearing means 327, 331 being disposed in casing end wall 251 and bearing means 329 333 being disposed in upper support wall 273, respectively. Driven idler shaft 315 has a plurality of splines 335 extending axially thereabout between opposite ends 323, 325 of the driven idler shaft, and pinion gear 317 is carried on the driven idler shaft generally adjacent lower opposite end 323 thereof in meshing engagement with input gear 291. Thus, the mesh between input gear 291 and pinion gear 317 effects the concerted driven rotation of idler shaft 315 with input shaft 287. Pinion gear 313 is carried on driving idler shaft 311 so as to be arranged in meshing engagement with output gear 309 on output shaft 303, and therefore the meshing engagement between pinion gear 313 and output gear 309 effects the conjoint driven rotation of output shaft 303 with the driving idler shaft, as discussed hereinafter. Another pinion gear 337 is also carried on idler shaft 311 generally in spaced relation with pinion gear 313 thereon.

Figure 22:
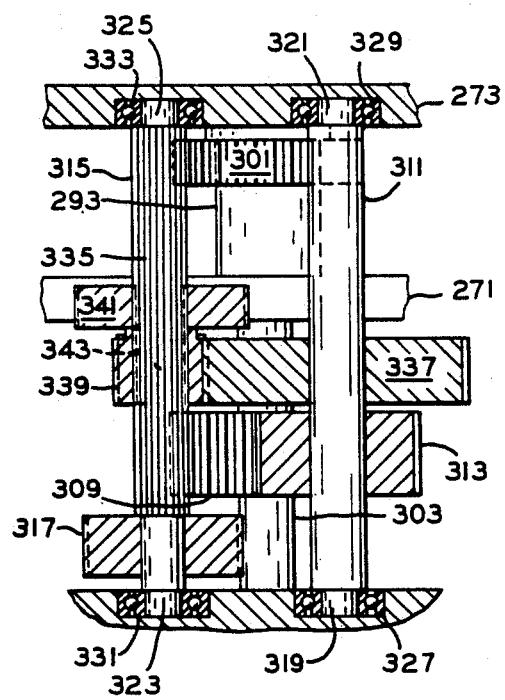

Transmitting means 261 also includes means, such as a pair of interconnected stepped shifting gears 339, 341 selectively movable between a plurality of shifted positions with respect to idler shafts 311, 315 and operable generally in one of the shifted positions (as best seen in FIG. 21) for coupling idler shaft 315 with tubular output shaft 293 and in another of the shifted positions thereof (as best seen in FIG. 22) for coupling idler shaft 315 with idler shaft 311. A splined bore 343 is coaxially provided through coupling means or stepped shifting gears 339, 341, and splines 335 on idler shaft 315 are cooperatively received in the splined bore so that the stepped shifting gears are axially movable between at least the upper shifted or spin position and the lower shifted or agitating position thereof on idler shaft 315. As discussed hereinafter, stepped shifting gears 339, 341 may also be provided with a third shifted position, such as a neutral or pump operating position, disengaged from output shafts 293, 303. Thus, through the engagement of splines 335 on idler shaft 315 with splined bore 343 of stepped shifting gears 339, 341, the stepped shifting gears are not only axially movable or shiftable on idler shaft 315 but also conjointly rotatable therewith in response to the rotation of input shaft 287. Larger stepped shifting gear 341 is arranged in meshing engagement with output gear 301 on tubular output shaft 293 when stepped shifting gears 339, 341 are in the upper shifted position thereof, and smaller shifting gear 339 is arranged in meshing engagement with intermediate pinion gear 337 on idler shaft 311 when the stepped shifting gears are in the lower shifted position thereof. To complete the description of transmission mechanism 245, a shift actuating device, schematically shown and indicated generally at 345, is selectively operable for moving a linkage 347 thereof to effect the shifting axial movement of stepped shifting gears 339, 341 connected with the leakage between the shifted positions of the stepped shifting gears on idler shaft 315; however, while the shift actuating device and linkage are illustrated herein in association with stepped shifting gears 339, 341, for purposes of disclosure, it is contemplated that other means may be employed for effecting the shifting of the stepped shifting gears between the shifted positions thereof, i.e., shifting transmission mechanism 245 between its aforementioned operating modes, within the scope of the invention so as to meet at least some of the objects thereof.

With respect to the operation of transmission device 245, it will be recalled that input shaft 287 may be driven or operated so as to be oscillatable in one operating mode of the transmission mechanism and unidirectionally rotated in another operating mode of the transmission mechanism. When input shaft 287 is unidirectionally rotated, linkage 347 is actuated by shifting device 345 so that stepped shifting gears 339. 341 are in the upper shifted position thereof (as best seen in FIG. 21) wherein larger stepped shifting gear 341 is meshed with output gear 301 of tubular output shaft 293. In this manner, unidirectional rotation of input shaft 287 is transmitted through meshed input gear 291 and pinion gear 317 to idler shaft 315 to effect the conjoint unidirectional rotation thereof with the input shaft. Since splines 335 on idler shaft 315 are received in splined bore 383 of stepped shifting gears 339,341, the stepped shifting gears are conjointly unidirectionally rotated with idler shaft 315, and this conjoint unidirectional rotation of the shifting gears is transmitted through meshed larger stepped shifting gear 341 to output gear 301 on tubular output shaft 293 so as to effect the conjoint undirectional rotation thereof with the stepped shifting gears. Thus, in the one operating mode of transmission mechanism 245 as determined by shifting device 345, the unidirectional rotation of input shaft 287 is transmitted to tubular output shaft 293 effecting the conjoint unidirectional rotation thereof with the input shaft while output shaft 303 remains at rest.

When linkage 347 is actuated by shifting device 345 so as to axially move stepped shifting gears 339, 341 downwardly toward its lower shifted position on idler shaft 315 (as best seen in FIG. 22), larger stepped shifting gear 341 is disengaged from output gear 301 on tubular output shaft 293, and smaller stepped shifting gear 339 is moved into meshing engagement with intermediate pinion gear 337 on idler shaft 311. With stepped shifting gears 339, 341 in their lower shifted position, transmission mechanism 245 may function in its another operating mode with input shaft 287 being oscillatally rotatable. Thus, the oscillation of input shaft 287 is transmitted through meshed input gear 291 and pinion gear 317 to idler shaft 315 to effect the conjoint oscillation thereof with the input shaft. Since splined bore 343 of stepped shifting gears 339, 341, is received on splines 335 of idler shaft 315, the stepped shifting gears are conjointly oscillated with idler shaft 315, and such conjoint oscillation is transmitted to idler shaft 311 through the meshing engagement of smaller stepped shifting gear 339 with intermediate gear 337 on idler shaft 311. This conjoint oscillation of idler shaft 311 with idler shaft 315 is transmitted to output shaft 303 through the meshing engagement of pinion gear 313 on idler shaft 311 with output gear 309 on output shaft 303. Thus, the oscillation of input shaft 287 is transmitted to output shaft 303 during the another operating mode of transmission mechanism 345.

In the foregoing description of transmission mechanism 245, casing 249 may contain a suitable lubricant (not shown) for lubricating the components and bearing means thereof; however, it is contemplated that at least the various gears of such components may be formed from a resin material within the scope of the invention so as to meet at least some of the objects thereof, and if so, then the casing and the lubricant may be omitted, and such bearing means may be of the self-lubricated type.

Figure 25:
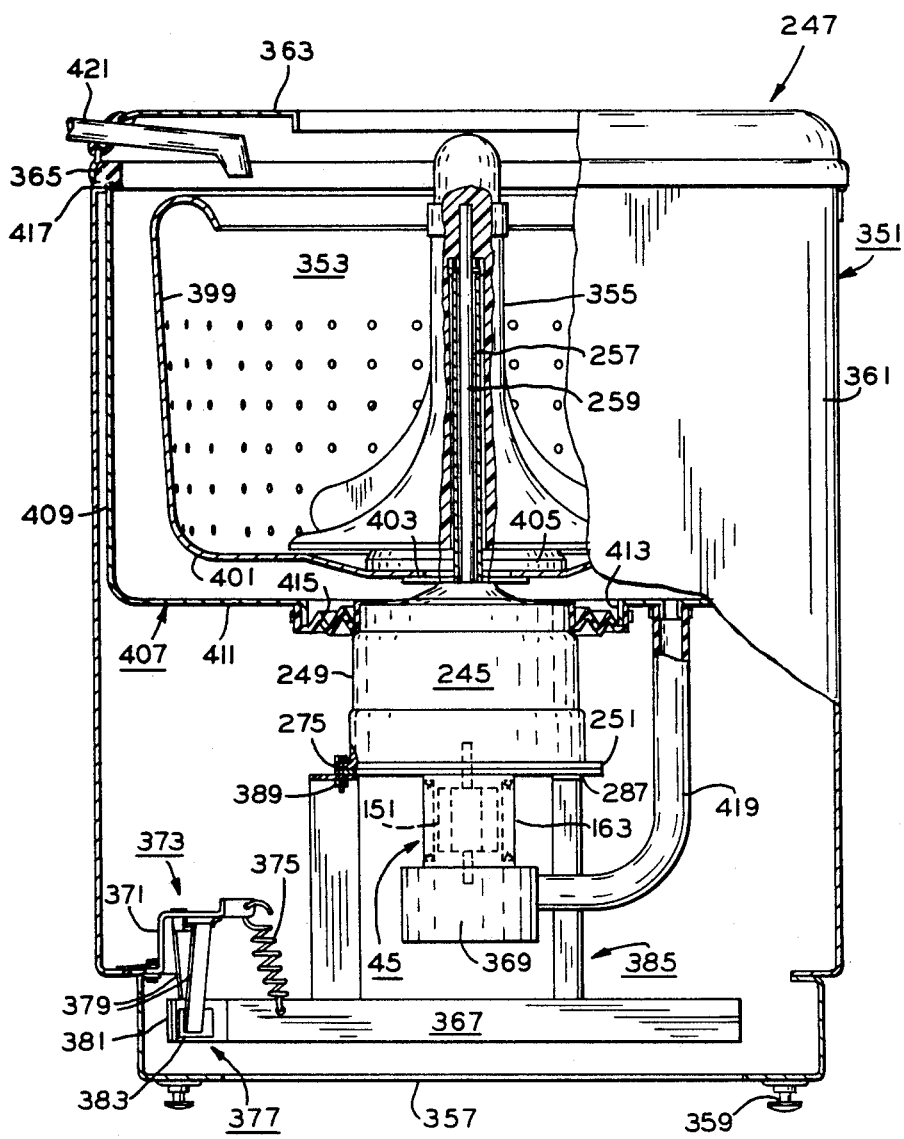
FIG. 25 is a partial sectional view illustrating a laundry machine as well as a drive therefor in one form of the invention.

With reference again to the drawings in general and recapitulating at least in part with respect to the foregoing, laundry or clothes washing machine 247 has a cabinet 351, and means, such as a perforate spin tub 353 or the like for instance, arranged within the cabinet for receiving water and clothes (not shown) to be laundered therein is adapted to be unidirectionally rotatable at a velocity great enough to centrifugally displace at least some of the water from the clothes to be laundered therein (FIG. 25). Means, such as an agitator 355 or the like for instance, arranged within receiving means or spin tub 353 so as to be generally coaxial therewith is adapted to be oscillated, i.e., rotated in opposite directions, for agitating the clothes in the water to effect the laundering thereof (FIG. 25). Electronically commutated motor 45 mounted within cabinet 351 has stationary assembly 163 with winding stages 171, 173, 175 wound therein and adapted to be commutated so as to be excited or energized in at least one preselected sequence and in at least one of preselected different sequences (FIGS. 16-19, 25 and 26). Rotatable assembly 151 is arranged with stationary assembly 163 in magnetic coupling relation with winding stages 171, 173, 175, and the rotatable assembly is oscillated upon the energization of the winding stages in the at least one preselected different sequences and also unidirectionally rotated upon the energization of the winding stages in the at least one preselected sequence (FIGS. 16-19, 25 and 26). Transmission mechanism 245 is adapted to be operatively connected with each of spin tub 353 and agitating means or agitator 355 for transmitting the oscillation movement of rotatable assembly 165 to the agitator so as to effect the conjoint oscillation movement thereof with the rotatable assembly and for transmitting the unidirectional rotation of the rotatable assembly to the spin tub so as to effect the conjoint unidirectional rotation thereof with the rotatable assembly, respectively (FIGS. 21-26). Input shaft 287 of transmission mechanism 245 is constituted by shaft 155 of rotatable assembly 151 (FIG. 25).

More particularly and with specific reference to FIGS. 25 and 26, cabinet 351 of laundry machine 247 has a base 357 with a plurality of adjustable or leveling support feet 359 thereon. An outer or upper cabinet structure 361 has the lower end portion therof supported on or otherwise connected to base 357 by suitable means, and the upper end portion of the upper cabinet structure supports or is otherwise connected with a cover 363 therefor. Sealing means, such as a resilient gasket 365 or the like for instance, is sealably fitted or otherwise interposed between the upper end portion of cabinet structure 361 and cover 363.

Laundry machine 247 is provided with a supporting frame 367 on which transmission mechanism 245, electronically commutated motor 45, a pump device 369 for the laundry machine, spin tub 353 and agitator 355 are supported generally in vertically aligned or in-line relation, as discussed hereinafter. Frame 367 is suspended or otherwise mounted within cabinet 351 on a plurality of brackets 371 suitably attached to base 357 by a plurality of damping means 373; however, for the sake of drawing simplicity only one of such bracket and damping means is shown in FIG. 25. Each vibration damping means 373 has resilient means, such as a coil spring 375 or the like for instance, biased or otherwise interconnected between bracket 371 and frame 367, and other resilient means, such as a generally U-shaped spring clamp 377 or the like for instance, is secured to the bracket having a pair of depending prestressed legs 379 straddling a part 381 of the frame in gripping engagement therewith with resilient friction pads 383 interposed between the legs and the frame part, respectively. Thus, vibration damping means 373 acts not only to limit or damp twisting or torquing movement but also vertical movement of frame 367 which may be imparted thereto particularly during the spin cycle or operating mode of laundry machine 247, as discussed hereinafter.

A platform or other upstanding structure 385 is generally centrally grounded on frame 367 and integrally connected thereto by suitable means (not shown), and lower end wall 251 on casing 249 of transmission mechanism 245 is seated on an upper free end or seat 287 of the platform being connected thereto by suitable means, such as a plurality of nuts and bolts 389 or the like for instance, arranged with mounting openings 275 in the lower end wall and aligned mounting openings 391 in the platform as best seen in FIG. 26. Further with respect to FIG. 26, it may be seen that end shield 215 of electronically commutated motor 45 is removed from housing 213 thereof, and flange 223 of housing sleeve 219 is abutted against lower end wall 251 of transmission mechanism casing 249 being secured by suitable means, such as a plurality of nuts 393 or the like for instance, threadedly received on stud plurality 285 extending from the lower end wall. Thus with electronically commutated motor 45 mounted to transmission mechanism 245 so as to depend therefrom through platform 385 toward frame 367, shaft extension 157 on rotatable assembly shaft 151 in electronically commutated motor 45 is journaled in bearing means 281 disposed in lower end wall 251 of transmission mechanism casing 249 so as to constitute input shaft 287 of the transmission mechanism, and of course, input gear 291 is mounted on the free end of shaft extension 157 so as to be conjointly rotatable with rotatable assembly 151 of the electronically commutated motor upon the energization thereof. The other end shield 217 of electronically commutated motor 45 may also be removed so that flange 225 of housing sleeve 219 is abutted against pump 369, and the other shaft extension 159 of rotatable assembly 151 extends into driving engagement with the pump of laundry machine 247. Pump 369 is secured to flange 225 of electronically commutated motor 45 by suitable means, such as a plurality of nuts 395 or the like for instance, threadedly received on a stud plurality 397 extending from the pump. While the aforementioned mounting arrangements or interconnections of transmission mechanism 245 to platform 385, electronically commutated motor 45 to the transmission mechanism, and pump 369 to the electronically commutated motor have been illustrated herein for the purposes of disclosure, it is contemplated that various other mounting arrangements or interconnections may be made between such components of laundry machine 247.

With reference again to FIG. 25, spin tub 353 includes a generally annular perforate sidewall 399 having a base wall 401 integrally interconnected therewith, and a generally central opening 403 extends through the base wall. Means, such as a collar 405 or the like for instance, is provided for securing spin tub 353 to tubular output shaft 293 of transmission mechanism 245, and the securing means or collar extends through opening 403 in spin tub base wall 401 being grippingly and sealably engaged with the opposite sides thereof generally about the opening. Albeit not shown, the tubular output shaft 293 extending exteriorly of transmission mechanism casing 249 is connected by suitable means with collar 405 so that spin tub 353 is conjointly unidirectionally rotatable with the tubular output shaft during the spin cycle of laundry machine 247, as discussed hereinfter. Further upper end 305 of output shaft 303, which extends exteriorly of transmission mechanism casing 249 and coaxially through tubular output shaft 293, is connected by suitable means (not shown) with agitator 355 so that the agitator is conjointly oscillated with output shaft 303 during the agitation cycle or operating mode of laundry machine 247, as also discussed hereinafter.

An intermediate or enclosing tub 407 is provided with a sidewall 409 spaced generally between spin tub sidewall 399 and upper cabinet structure 361, and a base wall 411 is integrally formed with the enclosing tub sidewall having a generally centrally located opening therethrough defined by an integral generally annular flange 413 depending from the base wall in spaced relation generally adjacent casing 249 of transmission mechanism 245. Sealing means, such as a resilient annular boot 415 or the like for instance, is sealably interconnected or otherwise interposed between flange 413 on enclosing tub 407 and casing 249 of transmission mechanism 245, and another generally annular flange 417 integrally formed on enclosing tub sidewall 409 about the free or upper end thereof extends into supporting engagement with the upper end portion of upper cabinet structure 361 and sealing engagement with gasket 365 extending thereabout. To complete the description of laudndry machine 247, conduit means, such as a hose 419 or other flexible connection for instance is connected between base wall 411 of enclosing tub 407 and pump 369 providing a passage for the removal from the enclosing tub of water selectively discharged into spin tub 353 through a nozzle 421.

In the operation of laundry machine 247, assume that stepped shifting gears 339, 341 in transmission mechanism 245 are disposed in the lower shifted or agitation position thereof with smaller stepped shifting gear 339 driving output shaft 303 through the meshing engagement of the smaller shifting gear with intermediate gear 337 on idler shaft 311 and the meshing engagement of pinion gear 313 thereon with output gear 309 on the output shaft, as discussed hereinabove with respect to FIGS. 21-24. With transmission mechanism 245 so set or shifted to effect the agitation cycle or operating mode of laundry machine 247, water may be introduced through nozzle 421 into spin tub 353 so that it flows through the perforations therein into enclosing tub 407, and clothes to be laundered in the water and a charge of detergent or the like (not shown) may also be placed in the spin tub. Of course, the level to which the water rises in enclosing tub 407 may be controlled by any suitable fluid level sensing means, as well known in the art. With this preparation, electronically commutated motor 45 may be energized to commence the wash or agitation cycle of laundry machine 247. Upon the energization of electronically commutated motor 45, winding stages 171, 173, 175 of the electronically commuted motor are commutated so as to be excited in the aforementioned preselected different sequences which effects the magnetic coupling therewith of rotatable assembly 151 so as to impart oscillating movement or rotation to the rotatable assembly. Of course, as previously mentioned, this oscillating rotation of rotatable assembly 151 may be of any desired or preselected speed depending upon the frequency of the commutation of winding stages 171, 173, 175 and also of any desired or preselected amplitude depending upon the time or number of cycles the frequency is applied to the winding stages. The oscillating rotation of rotatable assembly 151 is translated or transmitted by transmission mechanism 245 to its output shaft 303 which is drivingly connected or otherwise associated with agitator 355 so as to effect the conjoint oscillation thereof with the rotatable assembly of electronically commutated motor 45. In this manner, the oscillatory movement of agitator 355 within spin tub 353 effects the agitation and laundering of the clothes therein. Albeit not shown for purposes of brevity, pump 369 may include means for pumping water from enclosing tub 407 through a filter back into spin tub 353 in order to trap or filter out much of the lint which may be separated from the clothes as they are laundered during the above discussed agitation cycle of laundry machine 247. After laundry machine 247 has been operated for a desired or preselected period of time in its agitation cycle, electronically commutated motor 45 may be de-energized so as to terminate such agitation cycle.

Subsequent to the agitation cycle of laundry machine 247 and in order to initiate the spin cycle thereof, shifting device 345 for transmission mechanism 245 may be actuated causing its linkage 247 to move stepped shifting gears 339, 341 upwardly on idler shaft 315 toward the spin or upper shifted position thereof, as shown in FIG. 21, so that larger stepped shifting gear 341 is meshed with output gear 301 on tubular output shaft 293. At this time, electronically commutated motor 45 may be re-energized with its winding stages 171, 173, 175 commutated so as to be excited in a preselected sequence which effects the magnetic coupling therewith of rotatable assembly 151 in the manner discussed hereinbefore to impart unidirectional rotation to the rotatable assembly. As previously mentioned, the unidirectional speed of rotatable assembly 151 may be of any desired or preselected speed depending upon the the frequency with which winding stages 171, 173, 175 of electronically commutated motor 45 are commutated in the preselected sequence during the spin cycle of laundry machine 247; however, it is contemplated that the speed of the unidirectional rotation of the rotatable assembly will be appreciably greater than the speed of the above discussed oscillation rotation of the rotatable assembly. With stepped shifting gears 339, 341, moved into the upper shifted position thereof in transmission mechanism 245, as discussed above, the unidirectional rotation of rotatable assembly 151 is translated or transmitted by the transmission mechanism to its tubular output shaft 293 which is drivingly connected or otherwise associated with spin tub 353 so as to effect the conjoint unidirectional rotation thereof with the rotatable assembly of electronically commutated motor 45. In this manner, the unidirectional rotation of spin tub 353 is operative to effect the centrifugal displacement of water from the clothes within the spin tub, and of course, pump 369 may, if desired, be arranged to be driven by electronically commutated motor 45, as discussed hereinafter, and includes means for effecting the removal of water from the spin tub and enclosing tub 407 through hose 419 to a drain (not shown). After laundry machine 247 has been operated for a desired or preselected period of time in its spin cycle, electronically commutated motor 45 may be de-energized so as to terminate such spin operating mode.

To complete the operation of laundry machine 247, shifting device 345 may be selectively actuated to operate linkage 347 and move stepped shifting gears 339, 341 to the neutral position thereof, as previously mentioned, to effect a pumping cycle or mode of operation of the laundry machine. In their neutral position, stepped shifting gears 339, 341 are disengaged from output gear 301 on tubular output shaft 293 and from intermediate gear 337 on idler shaft 311 which is drivingly connected with through its gear 313 with output gear 309 on output shaft 303. Therefor, with stepped shifting gears 339, 341 in their neutral position, electronically commutated motor 45 may be energized to drive pump 369 while being, in effect, drivingly disconnected from spin tub 353 and agitator 355 by transmission mechanism 245.

It will be understood that while the above description of laundry machine 247 does not illustrate all of the valving and particular controls normally provided on modern laundry machines, the omission and/or simplification of these components is primarily for the purposes of brevity; however, it is contemplated that such components may be provided in the laundry machine and that such laundry machine may be provided with other operating modes or cycles within the scope of the invention so as to meet at least some of the objects thereof.

With reference again in general to the drawings and recapitulating with respect to the foregoing, it may be noted that a drive in one form of the invention is provided for laundry machine 247 (FIGS. 13-20 and 21-26). In this drive, transmission mechanism 245 has input means 255 adapted for both oscillating and unidirectional rotation, and coaxially arranged output means 257, 259 of the transmission mechanism are adapted for selective driven connection with the input means so as to be conjointly rotatable therewith, respectively (FIGS. 21-26). Electronically commutated motor 45 is associated in mounting relation with transmission mechanism 245 and includes rotatable assembly 151 connected generally in aligned and direct driving relation with the transmission so as to comprise the input means 255 thereof (FIGS. 25 and 26). Electronically commutated motor 45 further includes multi-stage winding arrangement 167 with each winding stage 171, 173, 175 thereof being selectively energizable to effect both oscillation and unidirectional rotation of rotatable assembly 151 thereof (FIGS. 13-20).

Figures 27, 28:
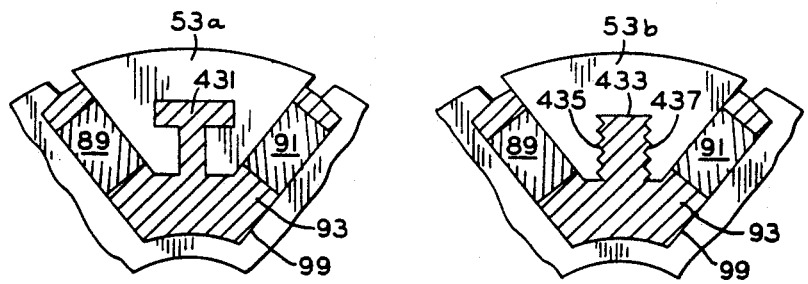
FIGS. 27 and 28 are partial sectional views illustrating alternative pole sections which may be utilized in the lamination of FIG. 1, the rotatable assembly of FIGS. 9-11 and the method of making such in FIGS. 2-8, respectively.

Referring now to FIGS. 27 and 28, alternative pole sections 53a and 53b are shown assembled in rotor 43 by generally the same method of making the rotor as discussed hereinabove and having generally the same component parts functioning in generally the same manner as the previously discussed pole section 53 with the following exceptions; however, while pole sections 53a and 53b may meet at least some of the objects set out hereinabove, it is believed that pole sections 53a and 53b also have indigenous objects and advantageous features which will be in part apparent and in part pointed out in the following discussion.

In pole sections 53a of FIG. 27, a generally T-shaped opening 431 is provided therethrough in which hardenable material 93 is received and solidified when provided in slots 99 of rotor 43 or otherwise introduced thereinto, as previously discussed with respect to the method of making the rotor and as indicated in functional diagram box 133 of FIG. 2. Thus, the abutment of hardenable material 93 with flanges 141, 143 of pole sections 49 and the coaction of the hardenable material with T-shaped opening 431 in pole sections 53a serves to retain both the pole sections 53a and magnets 89, 91 against displacement from the preselected or located positions thereof within rotor slots 99. It may be noted that seats 83, 85 provided on the previously discussed pole section 53 for seating abutment with magnets 89, 91 may be omitted from pole section 53a due to the retaining relationship of T-shaped opening 431 thereof with hardenable material 93 in rotor slots 99. While T-shaped opening 431 in pole section 53a is shown for purposes of disclosure, it is contemplated that other shaped openings may be provided in other pole sections for the retaining relationship with hardenable material 93 in rotor slots 99 within the scope of the invention so as to meet at least some of the objects thereof. Of course, one of those contemplated openings is shown at 433 in pole section 53b of FIG. 28. In opening 433, opposed serrations 435, 437 are provided on pole sections 53b in generally the same retaining relation with hardenable material 93 in rotor slots 99 as discussed above with respect to pole sections 53a.

Referring now to FIGS. 29-32, there is disclosed an alternative rotatable assembly 451 for use in electronically commutated motor 45 and also an alternative method of making, manufacturing or assembling a core or rotor 453 which may be utilized in the rotatable assembly. This alternative method and rotatable assembly 451 utilizes generally the same component parts arranged so as to function generally in the same manner as the previously discussed method and rotatable assembly 151 with the exceptions discussed hereinafter.

Figure 29:
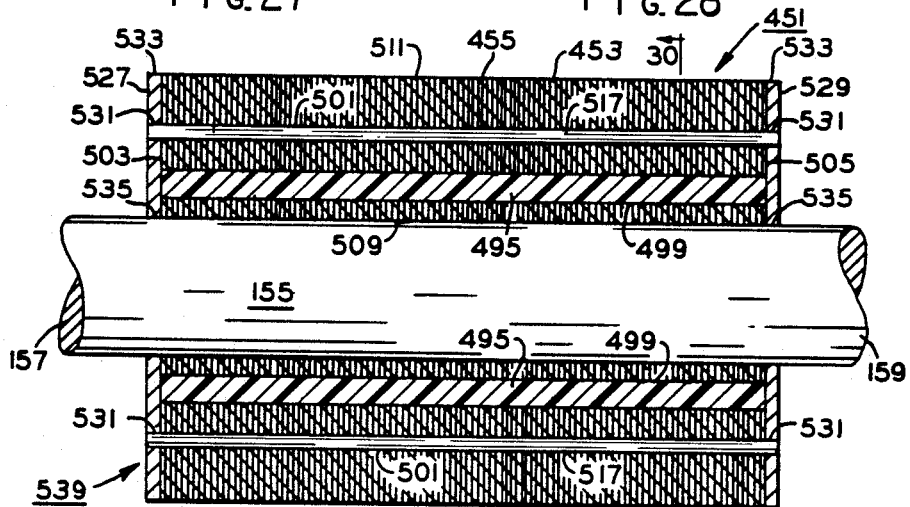
FIG. 29 is an elevational view partially in section illustrating an alternative rotatable assembly which may be utilized with the stationary assembly in the electronically commutated motor of FIGS. 15-19.
Figure 30:
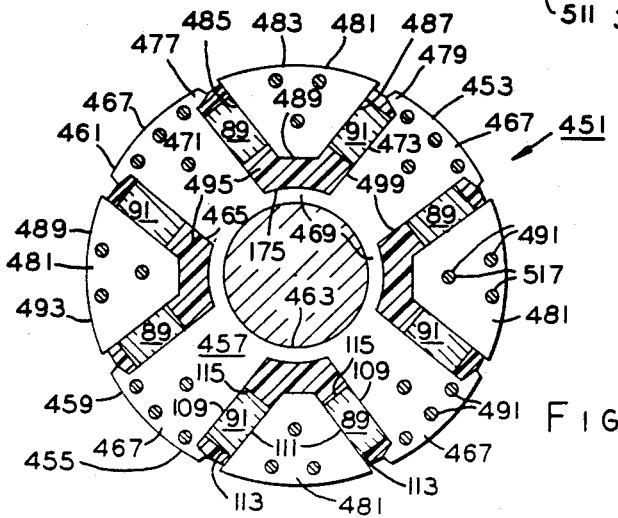
FIG. 30 is a sectional view taken along lines 30—30 in FIG. 29.

With reference to FIGS. 29 and 30, rotor 453 includes a stack 455 of laminations 457 arranged generally in juxtaposed or face-to-face relation in a desired stack length or height. Each lamination 457 has a unitary body 459 of generally thin ferromagnetic material, and a pair of radially spaced outer and inner peripheral edges 461, 463 are provided on the body with the inner peripheral edge defining a shaft receiving opening. A plurality of openings, such as generally U-shaped or V-shaped apertures or slots 465 for instance, are provided through body 459 intersecting with outer peripheral edge 461, and the openings are arranged with each other in generally arcuate spaced relation about the body. Thus, a plurality of pole sections 467 are respectively defined on body 459 between adjacent ones of openings 465 so as to extend between outer and inner peripheral edges 461, 463, and a plurality of means, such as inner peripheral bridges or connecting arms 469 for instance, on the body are interposed or otherwise integrally interconnected between adjacent ones of pole sections 467 for bridging therebetween generally adjacent the inner peripheral edge.

As previously mentioned, each of openings 465 intersect with outer peripheral edge 461, and the openings include a pair of opposed side edges 471, 473 extending generally in converging relation with respect to each other between outer and inner peripheral edges 461, 463 with an end edge 175 interconnected between the opposed side edges and spaced generally adjacent the inner peripheral edge. Thus, bridges 469 are defined on body 459 generally between end edge 475 of openings 465 and inner peripheral edge 463, and pole sections 467 are defined on the body generally between opposite ones of side edges 471, 473 of adjacent openings 465, respectively. A pair of opposed extensions or flanges 477, 479 are integrally provided on adjacent ones of pole sections 467 at least adjacent outer peripheral edge 461 and the flanges extend into openings 465 past opposed side edges 471, 473 thereof. While openings 465 are described herein as being generally V-shaped, it is contemplated that other openings having various other shapes may be employed in other laminations within the scope of the invention so as to meet at least some of the objects thereof.

A plurality of other pole sections 481 may be formed from generally the same ferromagnetic material as that of lamination body 459, and each of pole sections 481 is generally V-shaped so as to generally correspond to or fit within openings 465, as discussed in greater detail hereinafter. Pole sections 481 include a generally arcuate edge 483 formed so as to have generally the same radius of curvature as outer peripheral edge 461 on lamination body 459, and the arcuate edge interconnects between one of the ends a pair of opposite side edges 485, 487 on pole section 481, respectively. Opposite side edges 485, 487 extend generally convergently from arcuate edge 483, and the other of the ends of the opposite side edges are interconnected with free end edge 489 which is generally opposite arcuate edge 483. To complete the description of laminations 457 and pole sections 477, a plurality of amortisseur winding receiving apertures 491 are provided through the laminations and the pole sections.

Figure 31:
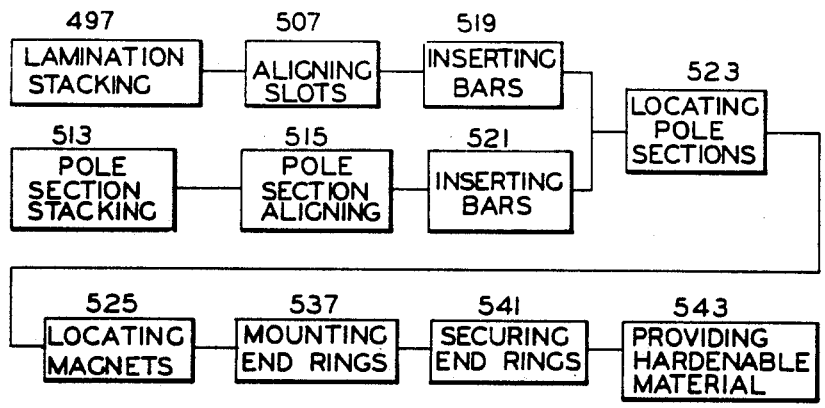
FIG. 31 is a functional box diagram illustrating a method of making a core for use in the rotatable assembly of FIG. 29.
Figure 32:
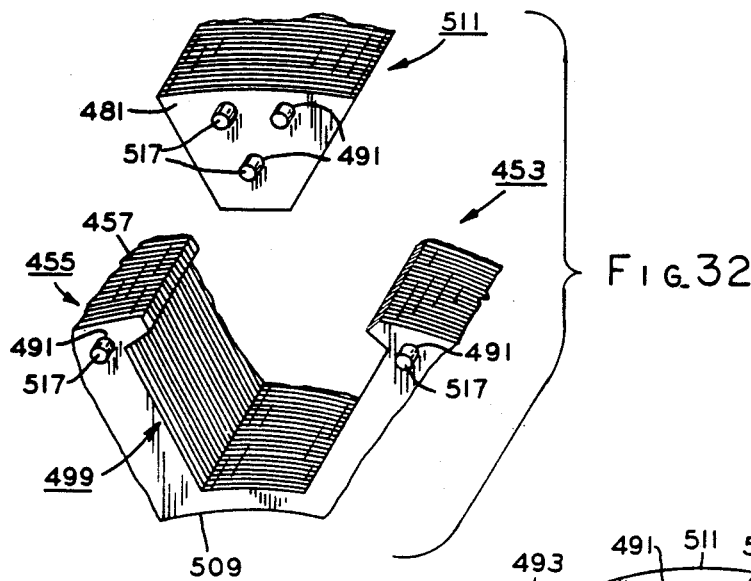
FIGS. 32 and 33 are enlarged partial views of the core of FIGS. 29 and 30 and illustrate principles which may be practiced in the method represented by the functional box diagram of FIG. 31.
Figure 33:
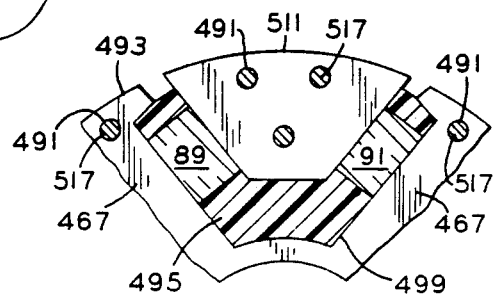

With reference in general to FIGS. 29-32 and recapitulating at least in part with respect to the foregoing, there is illustrated a method of making, manufacturing or assembling rotor 453, and the rotor has a plurality of discrete polar regions or areas, such as generally defined by pole sections 467 for instance, with such polar regions or pole sections being spaced apart generally about a peripheral portion 493 of the rotor (FIGS. 29, 30 and 32). In this method, a plurality of other discrete polar regions or areas, such as defined by pole sections 481 for instance, are positioned or otherwise placed or located in preselected positions between adjacent ones of pole sections 467, and a plurality of sets of magnetic material elements, such as magnets 89, 91 for instance are disposed or otherwise arranged between pole sections 481 and the pole section 477 adjacent thereto, respectively (FIGS. 30 and 32). A hardenable non-magnetic material 495 is solidified in place in rotor 453 between pole sections 467, 481 and magnets 89, 91 so as not only to effect magnetic polarity definition between pole sections 467 and pole sections 481 but also to retain pole sections 481 against displacement from the preselected positions thereof, respectively (FIG. 33). While hardenable nonmagnetic material 495 as discussed above is disclosed as a resin material, it is contemplated that other hardenable non-magnetic materials, such as aluminum, copper or alloys thereof for instance, may be employed in the method of making rotor 453 within the scope of the invention so as to meet at least some of the objects thereof.

More particularly and with specific reference to FIGS. 29-32, a plurality of laminations 457 are stacked or otherwise assembled together generally in juxtaposed or face-to-face relations thereby to form lamination stack 455, as shown in FIG. 29, and such stacking of the laminations is illustrated by functional diagram box 497 in FIG. 31. Either during or subsequent to the above discussed stacking of laminations 457 into rotor stack 455, openings 465 and apertures 491 of each of the laminations are respectively aligned or otherwise arranged or located with respect to each other so that such aligned openings define a plurality of slots or slot openings 499 and so that such aligned apertures define a plurality of amortisseur winding receiving opening or bores 501 which extend across or through rotor stack 455 between a pair of opposite ends or end faces 503, 505 thereof, respectively. Even though the alignment of openings 465 and apertures 491 so as to respectively form slots 499 and bores 501 may be accomplished during the stacking of laminations 457, as discussed above, such alignment is illustrated in a separate functional diagram box 507 in FIG. 31 for purposes of clarity. Further, albeit not shown for the sake of brevity, it is understood that suitable equipment may be employed to effect the stacking of laminations 457 and the alignment of openings 465 and apertures 491, as discussed above. Of course, it may also be noted that upon the alignment of openings 465 and apertures 491, outer and inner peripheral edges 461, 463 of laminations 457 in stack 455 thereof are also generally aligned or otherwise arranged with each other so that the outer peripheral edges define in part peripheral portion or wall 493 on rotor 453 between opposite ends 503, 505 thereof and inner peripheral edges 463 generally define a shaft receiving bore 509 extending through the rotor between the opposite end thereof, respectively, as best seen in FIG. 29. The particular edges on laminations 457 which define openings 465 therethrough, as discussed above, are also disposed generally in alignment with each other upon the alignment of the openings so as to form slots 499 in rotor stack 455, and such particular edges in their aligned formation define walls or wall means of the slots; however, for the sake of brevity, such slot walls will be designated by the reference numerals of such particular edges corresponding thereto when referred to hereinafter.

Either before, after or simultaneously with the above discussed stacking of laminations 457 and the alignment of openings 465 so as to define rotor slots 499, a plurality of pole sections 481 may also be stacked or otherwise assembled together generally in juxtaposed or face-to-face relations thereby to form a plurality of stacks 511 thereof, as best seen in FIGS. 29 and 32, with the pole section stacks having generally the same stack lengths or heights as lamination stack 455. Of course, either during such stacking of pole sections 481 or subsequent thereto, the particular edges on the pole sections are respectively aligned with each other so as to define walls or wall means on the pole section stack 511; however, for the sake of brevity, such pole section walls will be designated by the reference numerals of such particular edges corresponding thereto when referred to hereinafter. When the particular edges of pole sections 481 are so aligned, apertures 491 extending therethrough are also aligned with each other so as to define other amortisseur winding receiving bores 501 through pole sections stacks 511. Since the stacking and aligning of pole sections 481 may occur before, after or simultaneously with the stacking of laminations 457, as previously mentioned, the pole section stacking and aligning are respectively illustrated by functional diagram boxes 513 and 515 in FIG. 31 in parallel flow relation with box 493 which illustrates the lamination stacking. Albeit not shown for the purpose of brevity, it is understood that suitable equipment may be employed to effect the stacking and alignment of pole sections 481 into stacks 511 thereof.

Subsequent to the stacking and aligning of laminations 457 and pole sections 481, as discussed above, a plurality of amortisseur winding bars 517 of a nonmagnetic material yet having good electrical conductivity properties, such as aluminum, copper or alloys thereof for instance, may be inserted or otherwise placed or located in bores 501 extending through both lamination stack 455 and pole section stack 511, as best seen in FIGS. 29 and 32. Of course, the insertion of bars 517 through lamination stack 455 and pole section stacks 511 may occur simultaneously or one before the other, as desired; therefore, the insertion of the bars into the lamination stack and the pole section stacks are respectively illustrated in functional diagram boxes 519 and 521 in parallel flow relation with each other in FIG. 31. While bars 517 are disclosed herein as being inserted into bores 501 of both lamination stack 455 and pole section stack 511 subsequent to the respective stacking and aligning thereof, it is contemplated that the bores of both the laminations 457 and pole sections 477 may be assembled directly onto or about the bars arranged in predetermined positions so as to accommodate the stacking and alignment of the laminations and the pole sections thereon within the scope of the invention so as to meet at least some of the objects thereof. Of course, it is also contemplated that suitable equipment and/or fixtures (not shown) may be utilized to effect the placement of bars 517 with respect to bores 501 in lamination stack 457 and pole section stacks 511, respectively.

With bars 517 so placed in laminationn stack 457 and pole section stacks 511, the pole section stacks may be disposed, placed or otherwise located within slots 499 of lamination stack 455 is preselected positions therein. In these preselected positions, it may be noted that opposite sidewalls 485, 487 of pole sections stacks 511 are arranged generally in opposed facing relations with opposed sidewalls 471, 473 on adjacent ones of pole sections 467 on the lamination stack, and arcuate walls 483 of the pole section stacks are arranged so as to generally define in part peripheral portion 493 of rotor 453 or at least be generally coextensive therewith. Of course, free end walls 489 of pole section stacks 511 are disposed in spaced relation opposite end walls 475 of lamination stack 455 when the pole section stacks are in their respective preselected positions. The disposition of pole section stacks 511 in their respective preselected positions is illustrated by functional diagram box 523 in FIG. 31.

Either before, after or simultaneously with the placement of pole section stacks 511 in their preselected positions, as discussed above, sets of magnets 89, 91 may also be disposed, placed or otherwise located in preselected positions between opposite sidewalls 185, 187 of the pole section stacks and opposed sidewalls 171, 173 of pole sections 467 on lamination stack 455 adjacent the pole section stacks, respectively. Albeit desirable to abut opposite sidewalls 185, 187 of pole section stack 511 and opposite faces 109 of the magnets with opposed sidewalls 171, 173 of pole sections 467 on lamination stack 455, it is believed that the magnets may be generally loosely disposed therebetween, i.e., with respect to the manufacturing tolerances of the magnets, the pole section stack and the lamination stack, respectively. Of course, it is contemplated that suitable equipment and/or fixturing may be employed to provide for the location of pole section stacks 511 and magnets 89, 91 either simultaneously or in any order about rotor 453. Even though magnets 89, 91 may be located in their respective preselected positions either before, after or simultaneously with the placement of pole section stacks 511 in their respective preselected positions, as previously mentioned, the location of the magnets is illustrated for purpose of clarity in functional diagram box 525 in FIG. 31 separate from box 523 which illustrates the location of the pole section stacks. If laminations 457 and pole sections 481 are assembled into respective stacks 455 and 511 thereof on bars 517, as contemplated and previously mentioned hereinabove, it is further contemplated that magnets 89, 91 may be assembled with the respective stacks while they are mounted on the bars within the scope of the invention so as to meet at least some of the objects thereof.

Subsequent to the location of magnets 89, 91 with respect to lamination stack 455 and pole section stack 511, as discussed above, a pair of end rings 527, 529 are positioned or otherwise mounted generally in face-to-face relation with opposite end faces 503, 505 of the lamination stack and on the opposite ends of bars 517 extending through bores 501 in both pole section stacks 511 and the lamination stack past the end faces thereof, respectively. End rings 527, 529 are formed of a nonmagnetic material having acceptable electrical conductivity properties, such as aluminum, copper or alloys thereof for instance, and a plurality of apertures 531 are provided through the end rings generally in alignment with bores 501 in both lamination stack 455 and pole section stacks 511 so as to receive the opposite ends of bars 517 when the end rings are mounted thereto, respectively. End rings 527, 529 are respectively provided with generally radially spaced outer peripheral edges 533 and inner peripheral edges 535, and the outer peripheral edges are disposed at least adjacent peripheral portion 493 of rotor 453 while the inner peripheral edges are disposed at least adjacent shaft receiving bore 509 of the rotor. The mounting of end rings 527, 529, as discussed above, is illustrated by functional diagram box 537 in FIG. 31, and of course, it is also contemplated that suitable equipment and/or fixturing (not shown) may be employed to effect the mounting of the end rings.

With opposite ends of bars 517 so received in apertures 531 of end rings 527, 529, the bars and end rings are secured together in displacement preventing engagement and electrical contacting engagement by suitable means, such as soldering or the like for instance, thereby to form amortisseur winding 539 in rotor 453; however, it is contemplated that other means may be employed to effect the securement of the bars and the end rings within the scope of the invention so as to meet the objects thereof. The securement of end rings 527, 529 to bars 517, as discussed above, is illustrated by functional diagram box 541 in FIG. 31.

When end rings 527, 529 are so mounted in caging relation with lamination stack 455 and pole section stacks 511 and secured to the opposite ends of bars 517, as previously discussed, hardenable nonmagnetic material 495 is provided or otherwise introduced into slots 499 of lamination stack 455 between the end rings so as to fill the interstices within the slots between pole section stacks 511, pole sections 467 on the lamination stack and magnets 89, 91 disposed therebetween, as best seen in FIG. 33 and as illustrated by functional diagram box 543 in FIG. 31. As previously mentioned, upon the solidification of hardenable material 495 in slots 499, the hardenable material and magnets 89, 91 define the magnetic polarity of pole section stacks 511 from that of pole sections 467 on lamination stack 455, and since the hardenable material is engaged between opposite faces 113 of the magnets and flanges 477, 479 on the lamination stack, the hardenable material also serves to maintain or retain the magnets in their preselected positions against displacement therefrom respectively. It is also believed that the hardenable material may assist the amortisseur winding 539 in retaining pole section stacks 511 against displacement from their respective preselected positions in slots 499.

To complete the method of making rotor 453, peripheral portion 493 thereof may be turned or otherwise machined so as to provide the rotor with a preselected outside diameter generally in the same manner as discussed hereinabove with respect to the machining of rotor 43.

Upon the completion of rotor 453, bore 509 thereof may be mounted in gripping or displacement preventing engagement with shaft 155 generally in the same manner as discussed hereinbefore with respect to rotor 43. Thus, rotor 453 and shaft 155 comprise rotatable assembly 451 which is mounted or otherwise arranged with stationary assembly 161 of electronically commutated motor 45 so as to be operable therewith generally in the same manner as discussed hereinbefore with respect to rotatable assembly 151. Of course, it is also contemplated that magnets 89, 91 in rotatable assembly 451 may be magnetized in the same manner as previously discussed hereinabove.

From the foregoing, it is now apparent that a novel drive for laundry machine 247 has been presented meeting the objects set out hereinbefore, as well as others, and that changes as to the precise arrangements, shapes, details and connections of the component parts of such drive may be made by those having ordinary skill in the art without departing fromm the spirit of the invention or the scope thereof as set out in the claims which follow.

What I claim as new and desire to secure by Letters Patent of the United States is:

1. A drive for a laundry machine comprising:
an electronically commutated motor having a ferromagnetic stator with a bore therein, a plurality of winding receiving slots in said stator and intersecting with said bore, a multi-stage winding arrangement associated with said slots of said plurality thereof and including at least three winding stages adapted to be commutated in at least one preselected sequence and in at least a pair of preselected different sequences, each of said winding stages of said at least three thereof having a plurality of coils, each of said coils of said coil plurality in said each winding stage having at least one conductor turn and a pair of opposite sides turn portions, respectively, some of said coils in said each winding stage having at least one of said opposite side turn portions thereof disposed in individual ones of said slots with thereof disposed in individual ones of said slots with one of said opposite side turn portions of another of said coils in a same winding stage, respectively, one of said coils of two winding stages of said at least three thereof each having one of said opposite side turn portions thereof disposed in one slot of a first pair thereof and another of said coils of said two winding stages each having one of said opposite side turn portions thereof disposed in the other slot of said first slot pair respectively, a third coil in one of said two winding stages and one coil in a third winding stage of said at least three winding stages each having one of said opposite side turn portions thereof disposed in one slot of a second pair thereof and a fourth coil in said one of said two winding stages and another coil in said third winding stage each having one of said opposite side turn portions thereof disposed in the other slot of said second slot pair, and two coils of said coil plurality in the other of said two winding stages each having one of said opposite sides thereof disposed in a third pair of slots, respectively, a rotor disposed at least in part within said stator bore in magnetic coupling relation with said at least three winding stages so as to be unidirectionally rotatable when said at least three winding stages are commutated in the at least one preselected sequence and also oscillatable when said at least three winding stages are commutated in the at least preselected different sequence pairs, said rotor including a peripheral portion interposed between a pair of opposite end faces and arranged generally in coaxial relation with said stator bore, a shaft receiving opening extending through said rotor and intersecting with said opposite end faces, a plurality of discrete first pole sections integrally interconnected with each other and arranged in spaced relation generally about said rotor between said opposite end faces thereof, respectively, a plurality of other slots intersecting said peripheral portion between said opposite end faces and interposed between adjacent ones of said first pole sections of said plurality thereof, respectively, said other slots of said plurality thereof each having a pair of opposed sidewalls converging generally toward each other in a direction from said peripheral portion toward said shaft receiving opening with a base wall adjacent thereto interposed between said opposed sidewalls, and a plurality of pairs of opposed flanges extending between said opposite end faces at least adjacent said peripheral portion with said opposed flanges of said plurality thereof arranged so as to protrude into said other slots past said opposed sidewalls thereof, respectively, a plurality of discrete second pole sections arranged in said other slots between said opposed sidewalls thereof, respectively, said second pole sections of said plurality thereof each including another peripheral portion arranged so as to be at least generally coextensive with said first named peripheral portion, a pair of opposite sidewalls converging generally toward each other in a direction from said another peripheral portion toward said shaft receiving opening so as to be arranged generally in facing relation with said opposed sidewalls of said other slots and said opposed flanges, an end wall interposed between said opposite sidewalls and arranged generally in facing relation with said base wall, and a pair of opposite seats integral with said opposite sidewalls at least generally adjacent said end wall and extending generally toward said opposed sidewalls of said other slots, respectively, a plurality of pairs of magnetic material elements arranged in abutting engagement between said opposed sidewalls of said other slots and said opposite sidewalls of said second pole sections and with parts of said magnetic material element pairs of said plurality thereof engaged with said seats on said second pole sections, respectively, a hardenable non-magnetic material solidified in place within said other slots generally filling them and disposed between said flanges, said magnetic material element pairs, said first pole sections and said second pole sections so as to not only retain said second pole sections against displacement from said other slots but also to magnetically define the polarity of said first pole sections from that of said second pole sections, respectively, and a shaft received in said shaft receiving opening of said rotor is as to be conjointly unidirectionally rotatable and oscillatable therewith;

a transmission mechanism arranged in mounting association with said electronically commutated motor and having a housing with a plurality of wall means defining a chamber therein, said wall means of said plurality thereof including a pair of opposite end walls, and a sidewall interposed between said opposite end walls, a supporting structure seated on one of said opposite end walls within said chamber and including a pair of spaced apart supports disposed generally between said opposite end walls, respectively, said rotor shaft of said electronically commutated motor extending through said one opposite end wall into said chamber, an input gear on said rotor shaft within said chamber, a tubular output shaft extending through one of said supports and journaled in the other of said opposite end walls and the other of said supports, another bore through, said tubular output shaft, a first free end on said tubular shaft extending through said other opposite end wall exteriorly of said chamber, a first output gear on said tubular output shaft within said chamber and between said one and other supports, another output shaft extending though said chamber and said bore of said tubular output shaft so as to be journaled at least in said one opposite end wall, a second free end on said another output shaft and extending exteriorly of said chamber, or second output gear on said another output shaft within said chamber between said other support and said one opposite end wall, a drive shaft and a driving shaft within said chamber extending through said other support and having opposite ends thereof journaled in said one opposite end wall and said one support, respectively, said driving shaft having a plurality of splines arranged between ends thereof, a first pinion gear on said driving shaft and meshed with said input gear, a second pinion gear and a third pinion gear on said driven shaft and respectively arranged thereon between said one opposite end wall and said other support, said second pinion gear being meshed with said second output gear on said another output shaft, means selectively movable on said driven shaft between at least a pair of axially spaced positions thereon for effecting the transmission of the rotation of said rotor shaft to said tubular output shaft and said another output shaft, respectively, said transmission effecting means including a a pair of interconnected stepped shifting gears, a splined bore extending through said stepped shifting gears and receiving said splines of said plurality thereof on said driving shaft so as to be both conjointly rotatable therewith and selectively axially movable thereon between the positions of said at least pair thereof, the larger of said stepped shifting gears being meshed with said first output gear on said tubular output shaft when said stepped shifting gears are in one position of the at least pair thereof and the smaller of said shifting gears being meshed with said second output gear on said another shaft when said stepped shifting gears are in another position of the at least pair thereof.

2. A drive for a laundry machine comprising:

an electronically commutated motor including a stationary assembly having a plurality of winding receiving slots therein, a plurality of winding stages distributed in said slots and adapted to be electronically commutated in a plurality of preselected sequences, and a rotatable assembly arranged in selective magnetic coupling relation with said winding stages so that said rotatable assembly is undirectionally rotatable when at least some of said winding stages are electronically commutated in one of the preselected sequences and oscillatable when said winding stages are electronically commutated in another of the preselected sequences, respectively; and a transmission mechanism including a housing associated with said electronically commutated motor so that a part of said rotatable assembly extends into said housing, a pair of coaxially arranged output means arranged in part within said housing and in part exteriorly thereof and respectively adapted for conjoint rotation with said rotatable assembly of said electronically commutated motor, and means arranged in association with said output means pair and said rotatable assembly part and selectively operable for transmitting the oscillation of said rotatable assembly to one of said output means and for transmitting the undirectional rotation of said rotatable assembly to the other of said output means upon the electronic commutation of said winding stages in the one and another preselected sequences, respectively.

3. A drive for a laundry machine comprising:

an electronically commutated motor including a stationary assembly having a plurality of winding stages and adapted to be electronically commutated in a plurality of preselected sequences, and a rotatable assembly associated with said stationary assembly and adapted for selective magnetic coupling relation with said winding stages so that said rotatable assembly is unidirectionally rotatable when at least some of said winding stages are electronically commutated in one of the preselected sequences and oscillatable when said winding stages are electronically commutated in another of the preselected sequences, respectively;

a drive device for association in mounting relation with said electronically commutated motor so as to be directly driven by said rotatable assembly thereof and including means adapted for conjoint rotation with said rotatable assembly; and means associated with at least one of said rotatable assembly and said driving device and selectively operable for effecting a driven interconnection through said drive device of said conjoint rotation means with said rotatable assembly.

4. A drive for a laundry machine having a DC power source associated therewith comprising:

an electronically commutated motor adapted to be energized from the DC power source and including a stator, a multi-stage winding arrangement associated with said stator and having a plurality of winding stages adapted to be electronically commutated in a plurality of preselected sequences, and a rotatable assembly associated with said stator and arranged in selective magnetic coupling relation with said winding stages so as to be rotatably driven thereby, said rotatable assembly being rotatably driven in one direction in response to the electronic commutation of at least some of said winding means in one of the preselected sequences and also being rotatably driven in the one direction and another direction opposite thereto in response to the electronic commutation of said winding stages in another of the preselected sequences; and a drive device including a housing having a pair of opposite end portions with one of said opposite end portions being arranged in mounting relation with said electronically commutated motor, a pair of generally coaxial output means arranged within said housing so as to extend at least into the other of said opposite end portions thereof and adapted for conjoint rotation with said rotatable assembly of said electronically commutated motor, respectively, said rotatable assembly of said electronically commutated motor extending through said one opposite end portion of said housing, and means disposed within said housing for transmitting the rotation of said rotatable assembly in the one and another directions to one of said output means and for transmitting the rotation of said rotatable assembly in the one direction to the other of said output mens, respectively.

5. A drive as set fort in claim 4 wherein said transmitting means includes means associated in mechanical coupling relation with one of said one and other output means for driving it, driven means associated in mechanical coupling relation with said rotatable assembly for being driven by it, and means selectively movable between a pair of selected positions with respect to said driving means and said driven means and operable generally in one of the selected positions for mechanically coupling said driven means with the other of said one and other output means and operable generally in the other of said selected positions for mechanically coupling said driven means with said driving means.

6. A drive as set forth in claim 5 wherein said one and other output means include a pair of output gears, respectively, said mechanical coupling means in one of the one and other selected positions thereof being directly engaged with one of said output gears, and one of said driving and driven means including a gear train directly engaged with the other of said output gears, said mechanical coupling means in the other of the one and other selected positions thereof being directly engaged with said gear train.

7. A drive as set forth in claim 5 wherein said mechanical coupling means and said driven means respectively include means engaged therebetween for effecting the conjoint rotation of said mechanical coupling means and said driven means and for guiding the movement of said mechanical coupling means between the one and other selected positions thereof on said driven means, respectively.

8. A drive for a laundry machine having a DC power source associated therewith comprising:

an electronically commutated motor adapted to be energized from the DC power source and including a stator, a multi-stage winding arrangement associated with said stator and having a plurality of winding stages adapted to be electronically commutated in a plurality of preselected sequences, and a rotatable assembly associated with said stator and arranged in selective magnetic coupling relation with said winding stages so as to be rotatably driven thereby, said rotatable assembly being rotatably driven in one direction in response to the electronic commutation of at least some of said winding means in one of the preselected sequences and also being rotatably driven in the one direction and another direction opposite thereto in response to the electronic commutation of said winding stages in another of the preselected sequences; and a drive device including a housing having a pair of opposite end portions with one of said end portions being arranged in mounting relation with said electronically commutated motor, at least one output means arranged with said housing so as to extend at least into the other of said opposite end portions thereof, and said rotatable means of said electronically commutated motor extending in part past the other of said opposite end portions and defining at least in part input means for driving relation with said output means.

9. A drive as set forth in claim 8 wherein said drive device further includes means within said housing adapted for transmitting to said at least one output means the rotation of said input means in at least one of the one and another directions and the one direction at a rotational speed predeterminately less than that of said rotatable assembly of said electronically commutated motor.

10. A drive as set forth in claim 8 wherein said drive device further includes another output means within said housing and arranged generally coaxially with said at least one output means, and means selectively operable for transmitting to said at least one output means and said another output means the rotation of said input means in the one and another directions and in the one direction, respectively.

11. A drive as set forth in claim 10 wherein said drive device further includes means selectively movable between a pair of selected positions and operable generally in the selected positions for coupling said transmitting means between said output means and one of said at least one output means and said another output means, respectively.

* * * * *